(12) United States Patent
Lightner et al.

(10) Patent No.: US 9,430,547 B2
(45) Date of Patent: Aug. 30, 2016

(54) IMPLEMENTATION OF CLUSTERED IN-MEMORY DATABASE

(71) Applicant: QBASE, LLC, Reston, VA (US)

(72) Inventors: Scott Lightner, Leesburg, VA (US); Franz Weckesser, Spring Valley, OH (US); Telford Berkey, London, OH (US); Joseph Becknell, Kettering, OH (US); Bryan Zimmerman, Catlett, VA (US); Mats Persson, Carlsbad, CA (US)

(73) Assignee: QBase, LLC, Reston, VA (US)

( * ) Notice: Subject to any disclaimer, the term of this patent is extended or adjusted under 35 U.S.C. 154(b) by 0 days.

(21) Appl. No.: 14/558,254

(22) Filed: Dec. 2, 2014

(65) Prior Publication Data

US 2015/0154200 A1 Jun. 4, 2015

Related U.S. Application Data

(60) Provisional application No. 61/910,841, filed on Dec. 2, 2013.

(51) Int. Cl.
*G06F 17/30* (2006.01)
(52) U.S. Cl.
CPC ... *G06F 17/30584* (2013.01); *G06F 17/30365* (2013.01)
(58) Field of Classification Search
CPC .............. G06F 17/30153; G06F 17/30289; G06F 17/30371; G06F 17/30424; G06F 17/3053; G06F 17/30545
See application file for complete search history.

(56) References Cited

U.S. PATENT DOCUMENTS 6,128,660 A   10/2000   Grimm et al.
6,178,529 B1   1/2001   Short et al.
(Continued)

FOREIGN PATENT DOCUMENTS

WO   2013/003770 A2   1/2013

OTHER PUBLICATIONS

International Search Report and Written Opinion dated Mar. 10, 2015 corresponding to International Patent Application No. PCT/US2014/067999, 10 pages.
(Continued)

*Primary Examiner* — Scott A Waldron
(74) *Attorney, Agent, or Firm* — Eric L. Sophir; Dentons US LLP

(57) ABSTRACT

An in-memory database system and method for administrating a distributed in-memory database, comprising one or more nodes having modules configured to store and distribute database partitions of collections partitioned by a partitioner associated with a search conductor. Database collections are partitioned according to a schema. Partitions, collections, and records, are updated and removed when requested by a system interface, according to the schema. Supervisors determine a node status based on a heartbeat signal received from each node. Users can send queries through a system interface to search managers. Search managers apply a field processing technique, forward the search query to search conductors, and return a set of result records to the analytics agents. Analytics agents perform analytics processing on a candidate results records from a search manager. The search conductors comprising partitioners associated with a collection, search and score the records in a partition, then return a set of candidate result records after receiving a search query from a search manager.

30 Claims, 16 Drawing Sheets

(56) References Cited

U.S. PATENT DOCUMENTS

| | | |
|---|---|---|
| 6,266,781 B1 | 7/2001 | Chung et al. |
| 6,353,926 B1 | 3/2002 | Parthesarathy et al. |
| 6,457,026 B1 | 9/2002 | Graham et al. |
| 6,738,759 B1 | 5/2004 | Wheeler et al. |
| 6,832,373 B2 | 12/2004 | O'Neill |
| 6,832,737 B2 | 12/2004 | Karlsson et al. |
| 7,058,846 B1 | 6/2006 | Kelkar et al. |
| 7,370,323 B2 | 5/2008 | Marinelli et al. |
| 7,421,478 B1 | 9/2008 | Muchow |
| 7,447,940 B2 | 11/2008 | Peddada |
| 7,543,174 B1 | 6/2009 | van Rietschote et al. |
| 7,681,075 B2 | 3/2010 | Havemose et al. |
| 7,818,615 B2 | 10/2010 | Krajewski et al. |
| 7,899,871 B1 | 3/2011 | Kumar et al. |
| 8,055,933 B2 | 11/2011 | Jaehde et al. |
| 8,122,026 B1 | 2/2012 | Laroco et al. |
| 8,332,258 B1 | 12/2012 | Shaw |
| 8,341,622 B1 | 12/2012 | Eatough |
| 8,345,998 B2 | 1/2013 | Malik et al. |
| 8,356,036 B2 | 1/2013 | Betchel et al. |
| 8,375,073 B1 | 2/2013 | Jain |
| 8,423,522 B2 | 4/2013 | Lang et al. |
| 8,429,256 B2 | 4/2013 | Vidal et al. |
| 8,726,267 B2 | 5/2014 | Li et al. |
| 8,782,018 B2 | 7/2014 | Shim et al. |
| 8,995,717 B2 | 3/2015 | Cheng et al. |
| 9,009,153 B2 | 4/2015 | Khan et al. |
| 9,025,892 B1 | 5/2015 | Lightner et al. |
| 9,032,387 B1 | 5/2015 | Hill et al. |
| 9,087,005 B2 | 7/2015 | Chen et al. |
| 9,201,744 B2 | 12/2015 | Lightner et al. |
| 2001/0037398 A1 | 11/2001 | Chao et al. |
| 2002/0165847 A1 | 11/2002 | McCartney et al. |
| 2002/0174138 A1 | 11/2002 | Nakamura |
| 2003/0028869 A1 | 2/2003 | Drake et al. |
| 2003/0112792 A1 | 6/2003 | Cranor et al. |
| 2003/0158839 A1 | 8/2003 | Faybishenko et al. |
| 2003/0182282 A1 | 9/2003 | Ripley |
| 2004/0010502 A1 | 1/2004 | Bomfim et al. |
| 2004/0027349 A1 | 2/2004 | Landau et al. |
| 2004/0049478 A1 | 3/2004 | Jasper |
| 2004/0143571 A1 | 7/2004 | Bjornson et al. |
| 2004/0153869 A1 | 8/2004 | Marinelli et al. |
| 2004/0205064 A1 | 10/2004 | Zhou et al. |
| 2004/0215755 A1 | 10/2004 | O'Neill |
| 2005/0192994 A1 | 9/2005 | Caldwell et al. |
| 2006/0101081 A1 | 5/2006 | Lin et al. |
| 2006/0294071 A1 | 12/2006 | Weare et al. |
| 2007/0005639 A1 | 1/2007 | Gaussier et al. |
| 2007/0073708 A1 | 3/2007 | Smith et al. |
| 2007/0203693 A1 | 8/2007 | Estes |
| 2007/0203924 A1 | 8/2007 | Guha et al. |
| 2007/0240152 A1 | 10/2007 | Li et al. |
| 2007/0250519 A1 | 10/2007 | Fineberg et al. |
| 2007/0282959 A1 | 12/2007 | Stern |
| 2008/0010683 A1 | 1/2008 | Baddour et al. |
| 2008/0027920 A1 | 1/2008 | Schipunov et al. |
| 2009/0019013 A1 | 1/2009 | Tareen et al. |
| 2009/0043792 A1 | 2/2009 | Barsness et al. |
| 2009/0049038 A1 | 2/2009 | Gross |
| 2009/0089626 A1 | 4/2009 | Gotch et al. |
| 2009/0094484 A1 | 4/2009 | Son et al. |
| 2009/0144609 A1 | 6/2009 | Liang et al. |
| 2009/0216734 A1 | 8/2009 | Aghajanyan et al. |
| 2009/0240682 A1 | 9/2009 | Balmin et al. |
| 2009/0292660 A1 | 11/2009 | Behal et al. |
| 2009/0299999 A1 | 12/2009 | Loui et al. |
| 2009/0322756 A1 | 12/2009 | Robertson et al. |
| 2010/0077001 A1 | 3/2010 | Vogel et al. |
| 2010/0138931 A1 | 6/2010 | Thorley et al. |
| 2010/0223264 A1 | 9/2010 | Brucker et al. |
| 2010/0235311 A1 | 9/2010 | Cao et al. |
| 2010/0274785 A1 | 10/2010 | Procopiuc et al. |
| 2011/0071975 A1 | 3/2011 | Friedlander et al. |
| 2011/0093471 A1 | 4/2011 | Brockway et al. |
| 2011/0119243 A1 | 5/2011 | Diamond et al. |
| 2011/0125764 A1 | 5/2011 | Carmel et al. |
| 2011/0282888 A1 | 11/2011 | Koperski et al. |
| 2011/0296390 A1 | 12/2011 | Vidal et al. |
| 2011/0296397 A1 | 12/2011 | Vidal et al. |
| 2012/0030220 A1 | 2/2012 | Edwards et al. |
| 2012/0059839 A1* | 3/2012 | Andrade et al. .............. 707/760 |
| 2012/0102121 A1 | 4/2012 | Wu et al. |
| 2012/0117069 A1 | 5/2012 | Kawanishi et al. |
| 2012/0131139 A1 | 5/2012 | Siripurapu et al. |
| 2012/0246154 A1 | 9/2012 | Duan et al. |
| 2012/0310934 A1* | 12/2012 | Peh et al. ...................... 707/736 |
| 2012/0323839 A1 | 12/2012 | Kiciman et al. |
| 2013/0132405 A1 | 5/2013 | Bestgen et al. |
| 2013/0166480 A1 | 6/2013 | Popescu et al. |
| 2013/0166547 A1 | 6/2013 | Pasumarthi et al. |
| 2013/0290232 A1 | 10/2013 | Tsytsarau et al. |
| 2013/0303198 A1 | 11/2013 | Sadasivam et al. |
| 2013/0325660 A1 | 12/2013 | Callaway |
| 2013/0326325 A1 | 12/2013 | De et al. |
| 2014/0013233 A1 | 1/2014 | Ahlberg et al. |
| 2014/0022100 A1 | 1/2014 | Fallon et al. |
| 2014/0089237 A1 | 3/2014 | Adibi |
| 2014/0156634 A1 | 6/2014 | Buchmann et al. |
| 2014/0244550 A1 | 8/2014 | Jin et al. |
| 2014/0255003 A1 | 9/2014 | Abramson et al. |
| 2014/0280183 A1 | 9/2014 | Brown et al. |
| 2014/0351233 A1* | 11/2014 | Crupi et al. ................... 707/706 |
| 2015/0074037 A1* | 3/2015 | Sarferaz ........................ 707/602 |
| 2015/0154079 A1 | 6/2015 | Lightner et al. |
| 2015/0154194 A1 | 6/2015 | Lightner et al. |
| 2015/0154200 A1 | 6/2015 | Lightner et al. |
| 2015/0154264 A1 | 6/2015 | Lightner et al. |
| 2015/0154283 A1 | 6/2015 | Lightner et al. |
| 2015/0154286 A1 | 6/2015 | Lightner et al. |
| 2015/0154297 A1 | 6/2015 | Lightner et al. |

OTHER PUBLICATIONS

International Search Report and Written Opinion dated Mar. 6, 2015 corresponding to International Patent Application No. PCT/US2014/067993, 9 pages.

International Search Report and Written Opinion of the International Searching Authority dated Mar. 3, 2015 corresponding to International Patent Application No. PCT/US2014/067921, 10 pages.

International Search Report and Written Opinion of the International Searching Authority dated Feb. 24, 2015 corresponding to International Patent Application No. PCT/US2014/067918, 10 pages.

Tunkelang, D., "Faceted Search," Morgan & Claypool Publ., 2009, pp. i-79.

Schuth, A., et al., "University of Amsterdam Data Centric Ad Hoc and Faceted Search Runs," ISLA, 2012, pp. 155-160.

Tools, Search Query Suggestions using ElasticSearch via Shingle Filter and Facets, Nov. 2012, pp. 1-12.

Bouchenak, S., "Architecture-Based Autonomous Repair Management: An Application to J2EE Clusters", Proceedings of the 24th IEEE Symposium on Reliable Distributed Systems [online], 2005 [retrieved Dec. 16, 2015]. Retrieved from Internet: <URL: http://ieeexplore.ieee.org/stamp/stamp.jsp?tp=&arnumber=1541181>, pp. 1-12.

Wang, et al., "Automatic Online News Issue Construction in Web Environment," WWW 2008/Refereed Track: Search—Applications, Apr. 21-25, 2008—Beijing, China, pp. 457-466.

Blei et al., "Latent Dirichlet Allocation"Journal of Machine Learning Research 3 (2003), pp. 993-1022.

Chuang et al., "A Practical Web-based Approach to Generating Topic Hierarchy for Text Segments,"CIKM '04, Nov. 8-13, 2004, Washington, DC, USA, Copyright 2004 ACM 1-58113-874-0/04/0011, pp. 127-136.

Vizard, The Rise of In-Memory Databases, Jul. 13, 2012.

International Search Report and Written Opinion of the International Searching Authority dated Apr. 15, 2015 corresponding to International Patent Application No. PCT/US2014/068002, 10 pages.

* cited by examiner

IMPLEMENTATION OF CLUSTERED IN-MEMORY DATABASE

CROSS-REFERENCE TO RELATED APPLICATIONS

This non-provisional patent application claims the benefit of U.S. Provisional Application No. 61/910,841, entitled "An Implementation of Clustered In-Memory Database," filed on Dec. 2, 2013, which is hereby incorporated by reference in its entirety.

This application is related to U.S. patent application Ser. No. 14/557,794, entitled "Method for Disambiguating Features in Unstructured Text," filed Dec. 2, 2014; U.S. patent application Ser. No. 14/558,300, entitled "Event Detection Through Text Analysis Using Trained Event Template Models," filed Dec. 2, 2014; U.S. patent application Ser. No. 14/557,807, entitled "Method for Facet Searching and Search Suggestions," filed Dec. 2, 2014; U.S. patent Ser. No. 14/557,827, entitled "Real-Time Distributed In Memory Search Architecture," filed Dec. 2, 2014; U.S. patent application Ser. No. 14/557,951, entitled "Fault Tolerant Architecture for Distributed Computing Systems," filed Dec. 2, 2014; U.S. patent application Ser. No. 14/558,009, entitled "Dependency Manager for Databases," filed Dec. 2, 2014; U.S. patent application Ser. No. 14/558,055, entitled "Pluggable Architecture for Embedding Analytics in Clustered In-Memory Databases," filed Dec. 2, 2014; U.S. patent application Ser. No. 14/558,101 "Non-Exclusionary Search Within In-Memory Databases," filed Dec. 2, 2014; and U.S. patent application Ser. No. 14/557,900, entitled "Data record compression with progressive and/or selective decompression," filed Dec. 2, 2014; each of which are incorporated herein by reference in their entirety.

TECHNICAL FIELD

The present disclosure relates in general to databases, and more specifically to in-memory databases.

BACKGROUND

Computers are powerful tools of use in storing and providing access to vast amounts of information, while databases are a common mechanism for storing information on computer systems while providing easy access to users. Typically, a database is an organized collection of information stored as "records" having "fields" of information (e.g., a restaurant database may have a record for each restaurant in a region, where each record contains fields describing characteristics of the restaurant, such as name, address, type of cuisine, and the like).

In operation, a database management system frequently needs to retrieve data from or persist data to storage devices such as disks. Unfortunately, access to such storage devices can be somewhat slow. To speed up access to data, databases typically employ a "cache" or "buffer cache" which is a section of relatively faster memory (e.g., random access memory (RAM)) allocated to store recently used data objects. Memory is typically provided on semiconductor or other electrical storage media and is coupled to a CPU (central processing unit) via a fast data bus which enables data maintained in memory to be accessed more rapidly than data stored on disks.

One approach that may be taken when attempting to solve this problem is to store all the information in the database in memory, however as memory provided on computer systems has a limited size there are a number of obstacles that must be faced when attempting to handle databases of a larger scale.

As such, there is a continuing need for improved methods of storing and retrieving data at high speeds at a large scale.

SUMMARY

Disclosed herein is a system architecture hosting an in-memory database, which may include any suitable combination of computing devices and software modules for storing, manipulating, and retrieving data records of the in-memory database that is hosted within the distributed computing architecture of the system. Software modules executed by computing hardware of the system may include a system interface, a search manager, an analytics agent, a search conductor, a partitioner, collections of data, a supervisor, a dependency manager; any suitable combination of these software modules may be found in the system architecture hosting the in-memory database.

Nodes executing software modules may compress data stored in the records to make in-memory storage, queries, and retrieval feasible for massive data sets. Compression and decompression may be performed at nearly any level of the database (e.g., database level, collection level, record level, field level). Nodes executing software modules may provide support for storing complex data structures, such as JavaScript Object Notation (JSON) in the distributed in-memory database. Embodiments of an in-memory database system may be fault-tolerant due to the distributed architecture of system components and the various hardware and software modules of the system that are capable of monitoring and restoring faulty services. Fault-tolerance may include system component redundancy, and automated recovery procedures for system components, among other techniques. The in memory database may effectively and efficiently query data by scoring data using scoring methods. Search results may be ranked according to the scoring methods used to score the data, thereby allowing users and/or nodes executing queries to utilize data in ways that are more tailored and contextually relevant from one query to the next. Nodes executing analytics agents may perform various advanced analytics on records stored in the in-memory database image of data. In some cases, analytics may be performed on the records retrieved with a set of search query results by search conductors.

In one embodiment, a computing system hosting an in-memory database, the system comprising: a partitioner node comprising a processor configured to, in response to receiving a collection of one or more records of a database, determine whether to compress the collection based on a machine-readable schema file associated with the collection, logically partition the collection into one or more partitions according to the schema file, and distribute the one or more partitions to one or more storage nodes according to the schema file; a storage node comprising non-transitory machine-readable main memory storing a partition received from the partitioner associated with the storage node; a search manager node comprising a processor receiving a search query from a client device of the system, and transmitting the search queries as search conductor queries to one or more search conductors in response to receive the search query from the client device, wherein the search query is a machine-readable computer file containing parameters associated with one or more records satisfying the search query; a search conductor node associated with one or more partitioners and comprising a processor configured to, in response to receiving a search conductor query from the search manager node: query a set of one or more partitions indicated by the search conductor query, identify one or more candidate records stored in the set of queried partitions, calculate a first score for each respective candidate record using a scoring algorithm, and transmit to the search manager a set of one or more query results containing one or more candidate records satisfying a threshold value; and an analytics agent node comprising a processor configured to automatically generate a machine-readable computer file containing a set of one or more data linkages for the set of query results, responsive to identifying in the set of query results received from the search manager node a data linkage correlating two or more records, wherein the data linkage correlates data contained in a first record associated with data contained in a second record.

In another embodiment, a computer implemented method comprises receiving, by a search manager computer of a system hosting an in-memory database, binary data representing a search query containing parameters querying the database, wherein the system comprises one or more storage nodes comprising main memory storing one or more collections of the database, wherein each collection contains one or more records, transmitting, by the computer, the search query to one or more search conductor nodes according to the search query, wherein the search query indicates a set of one or more collections to be queried; transmitting, by the computer, to one or more analytics agent nodes a set of search results based on the search query responsive to receiving from the one or more search conductors the set of search results containing one or more records satisfying the search query, wherein each respective record of the set of search results is associated with a score based on a scoring algorithm in the search query; and responsive to the computer receiving a computer file containing a set of one or more data linkages from the one or more analytics agent nodes: updating, by the computer, the one or more records of the set of search results according to the set of one or more data linkages received from the analytics agent nodes.

In another embodiment, a computer-implemented method comprises receiving, by a computer, one or more collections from a search conductor according to a schema file, wherein each of the collections comprises a set of one or more records having one or more fields; partitioning, by the computer, each collection according to the schema; compressing, by the computer, the records in the partition according to the schema; and distributing, by the computer, each of the partitions to one or more associated search conductors to include each of the partitions in each collection corresponding to the partitioner associated with the search conductor.

Numerous other aspects, features of the present disclosure may be made apparent from the following detailed description. Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DEFINITIONS

Figure 1:
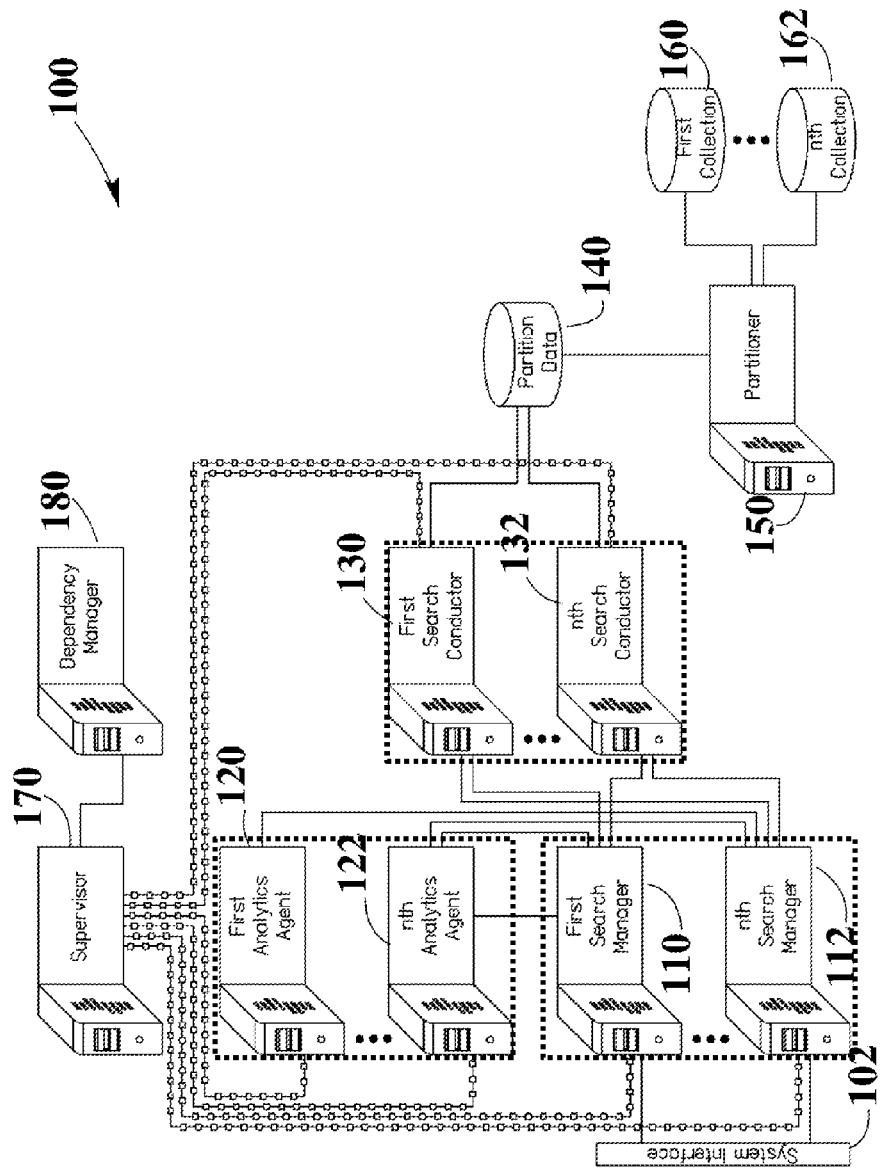
FIG. 1 shows an in-memory database architecture according to an exemplary embodiment.

As used herein, the following terms have the following definitions:

"Node" refers to a computer hardware configuration suitable for running one or more modules.

"Cluster" refers to a set of one or more nodes.

"Module" refers to a computer software component suitable for carrying out one or more defined tasks.

"Collection" refers to a discrete set of records.

"Record" refers to one or more pieces of information that may be handled as a unit.

"Field" refers to one data element within a record.

"Partition" refers to an arbitrarily delimited portion of records of a collection.

"Schema" refers to data describing one or more characteristics of one or more records.

"Search Manager", or "S.M.", refers to a module configured to at least receive one or more queries and return one or more search results.

"Analytics Agent", "Analytics Module", "A.A.", or "A.M.", refers to a module configured to at least receive one or more records, process said one or more records, and return the resulting one or more processed records.

"Search Conductor", or "S.C.", refers to a module configured to at least run one or more queries on a partition and return the search results to one or more search managers.

"Node Manager", or "N.M.", refers to a module configured to at least perform one or more commands on a node and communicate with one or more supervisors.

"Supervisor" refers to a module configured to at least communicate with one or more components of a system and determine one or more statuses.

"Heartbeat", or "HB", refers to a signal communicating at least one or more statuses to one or more supervisors.

"Partitioner" refers to a module configured to at least divide one or more collections into one or more partitions.

"Dependency Manager", or "D.M.", refers to a module configured to at least include one or more dependency trees associated with one or more modules, partitions, or suitable combinations, in a system; to at least receive a request for information relating to any one or more suitable portions of said one or more dependency trees; and to at least return one or more configurations derived from said portions.

"Database" refers to any system including any combination of clusters and modules suitable for storing one or more collections and suitable to process one or more queries.

"Query" refers to a request to retrieve information from one or more suitable partitions or databases.

"Memory" refers to any hardware component suitable for storing information and retrieving said information at a sufficiently high speed.

"Fragment" refers to separating records into smaller records until a desired level of granularity is achieved.

DETAILED DESCRIPTION

Reference will now be made in detail to several preferred embodiments, examples of which are illustrated in the accompanying drawings. The embodiments described herein are intended to be exemplary. One skilled in the art recognizes that numerous alternative components and embodiments may be substituted for the particular examples described herein and still fall within the scope of the invention.

Exemplary embodiments describe an in-memory database including one or more clusters and one or more modules, where suitable modules may include one or more of a search manager, an analytics agent, a node manager, a search conductor, a supervisor, a dependency manager, and/or a partitioner.

System Configuration

In-Memory Database Architecture

An in-memory database is a database storing data in records controlled by a database management system (DBMS) configured to store data records in a device's main memory, as opposed to conventional databases and DBMS modules that store data in "disk" memory. Conventional disk storage requires processors (CPUs) to execute read and write commands to a device's hard disk, thus requiring CPUs to execute instructions to locate (i.e., seek) and retrieve the memory location for the data, before performing some type of operation with the data at that memory location. In-memory database systems access data that is placed into main memory, and then addressed accordingly, thereby mitigating the number of instructions performed by the CPUs and eliminating the seek time associated with CPUs seeking data on hard disk.

In-memory databases may be implemented in a distributed computing architecture, which may be a computing system comprising one or more nodes configured to aggregate the nodes' respective resources (e.g., memory, disks, processors). As disclosed herein, embodiments of a computing system hosting an in-memory database may distribute and store data records of the database among one or more nodes. In some embodiments, these nodes are formed into "clusters" of nodes. In some embodiments, these clusters of nodes store portions, or "collections," of database information.

In one or more embodiments, a system interface may feed one or more search queries to one or more search managers. The search managers may be linked to one or more analytics agents that perform certain analytic techniques depending upon the embodiment and return the results to a search manager. The search managers may be linked to one or more search conductors. The search conductors may service search queries and database updates to one or more data partitions. In one or more embodiments, one or more nodes comprising a partitioner store one or more partitions of one or more database collections. A partition of a collection stores one or more records of the collection that have been partitioned into the particular partition. Thus, the one or more nodes storing each of the partitions of a collection are storing records of the in-memory database.

Partitioner Compression

An in-memory database may be an organized collection of information stored as "records" having "fields" of information. For example, a restaurant database may have a record for each restaurant in a region, and each record contains a different field for describing each of the characteristics of the restaurant, such as name, address, type of cuisine, and the like.

An embodiment of an in-memory database may use clusters of one or more nodes to store and access data; larger amounts of data may require larger amounts of non-transitory, machine-readable storage space. Compression reduces the amount of storage space required to host the information.

In some embodiments, one or more collections may be described using any suitable schema that defines the compression technique used for one or more fields of the one or more records of the one or more collections. In these embodiments, one or more fields may be compressed by a partitioner using one or more techniques suitable for compressing the type of data stored in a field.

In some embodiments, the type of data stored in a field may be compressed after fragmentation in which records in a collection are separated into smaller records until a desired data granularity is achieved. In such embodiments, fragmented record indices may be used to identify which record the fields were fragmented from to ensure the system remains aware that the records originate from the same original record of the collection. Fragmented records may be compressed further by according to one or more fragmenting algorithms.

In some embodiments, one or more collections may be indexed and/or compressed by one or more partitioner modules, which may be associated with one or more search conductor modules of an in-memory database system. In some embodiments, one or more compression techniques facilitate data compression while allowing data to be decompressed and/or accessed at any level of the in-memory database, including the field level, the record level, or the collection level.

System Architecture

FIG. 1 shows system architecture 100 having system interface 102, first search manager 110, nth search manager 112, first analytics agent 120, nth analytics agent 122, first search conductor 130, nth search conductor 132, partition data 140, partitioner 150, first collection 160, nth collection 162, supervisor 170, and dependency manager 180.

In one or more embodiments, system interface 102 may feed one or more queries generated outside system architecture 100 to one or more search managers 110, 112 in a first cluster including at least one node including a first search manager 110 and up to n nodes including an nth search manager 112. The one or more search managers 110, 112 in said first cluster may be linked to one or more analytics agents 120, 122 in a second cluster including at least a first analytics agent 120 and up to nth analytics agent 122.

Search managers 110, 112 in the first cluster may be linked to one or more search conductors 130, 132 in a third cluster. The third cluster may include at least a first search conductor 130 and up to an nth search conductor 132. Each search node (i.e., node executing search manager 110, 112) may include any suitable number of search conductors 130, 132.

Search conductors 130, 132 in the third cluster may be linked to one or more database nodes storing partition data 140. Partition data 140 may include one or more partitions (i.e., arbitrarily delimited portions of records partitioned from a discrete set of records) generated by a node executing one or more partitioners 150, which may be a module configured to at least divide one or more collections into one or more partitions. Each of the partitions may correspond to at least a first collection 160 and up to nth collection 162. The collections 160, 162 may additionally be described by one or more schemata files, which may define the data in the collections 160, 162. The one or more schemata may include information about the name of the fields in records of the partitions, whether said fields are indexed, what compression method was used, and what scoring algorithm is the default for the fields, amongst others. The schemata may be used by partitioners 150 when partitioning the first collection 160 and up to nth collection 162, and may be additionally be used by the first search manager 110 and up nth search manager 112 when executing one or more queries on the collections.

One or more nodes may execute a supervisor 170 software module that receives a heartbeat signal transmitted from other nodes of the system 100. A supervisor 170 may be configured to receive data from nodes of the system 100 that execute one or more dependency manager 180 software modules. A dependency manager 180 node may store, update, and reference dependency trees associated with one or more modules, partitions, or suitable combinations thereof, which may indicate configuration dependencies for nodes, modules, and partitions, based on relative relationships. A supervisor 170 may additionally be linked to other nodes in the system 100 executing one or more other supervisors 170. In some cases, links to additional supervisors 170 may cross between clusters of the system architecture 100.

Nodes executing an analytics agent 120,122 may execute one or more suitable analytics modules, which conform to a specified application programming interface (API) that facilitates interoperability and data transfer between the components of the system (e.g., software modules, nodes). Analytics agents 120, 122 may be configured to process aggregated query results returned from search conductors 130, 132. For example, a search manager 110 may receive a search query and then generate search conductor queries, which the search manager 110 issues to one or more search conductors 130, 132. After the search conductors 130, 132 execute their respectively assigned search conductor queries, the search manager 110 will receive a set of aggregated query results from the one or more search conductors 130, 132. The search manager 110 may forward these search query results to an analytics agent 120 for further processing, if further processing is required by the parameters of the search query.

In some implementations, after a search manager 110 determines the search query has requested for an analytics agent 120 to process one or more sets of aggregated results received from the search conductors 130, 132, the search manager 110 may transmit a database schema file and/or one or more analytical parameters to the analytics agents 120, 122. In some cases, the search query may request particular analytics algorithms to be performed, which the search manager 110 may use to identify which analytics agent 120 should receive aggregated search results. In some cases, one or more of the sets of aggregated results may be transmitted to the analytics agents 120, 122 in the form of compressed records, which contain data compressed according to a compression algorithm. In some cases, data of the records may be compressed at the fields of the records; and in some cases, full records may be compressed.

Nodes executing analytics agents 120, 122 having various analytics modules. Non-limiting examples may include: disambiguation modules, linking modules, and link on-the-fly modules, among other suitable modules and algorithms. As detailed later, linking modules and link-on-the-fly modules may identify, generate, and/or store metadata that links data previously stored in records of the database. Suitable modules may include any software implementation of analytical methods for processing any kind of data. In some embodiments, particular analytics modules or analytics agents 120, 122 may be accessible only to predetermined instances, clusters, partitions, or/or instantiated objects of an in-memory database.

Analytics Modules

According to an embodiment, an application programming interface (API) may be used to create a plurality of analytics modules, and the disclosed system architecture may allow the addition of multiple customized analytics modules executed by analytics agents of the system, which may be added to the system architecture, without interrupting operation or services, which may support dynamic processing of constant streams of data.

Newly created analytics modules may be easily plugged into the database using simple module set up processes and may enable the application in real time to apply one or more analytical methods to aggregated results lists, without having to change how the data is managed, prepared and stored. Separate APIs may be constructed to support models which score records against queries, typically a search conductor function, or to perform closure or other aggregate analytical function on a record set, typically an analytics agent task.

Figure 2:
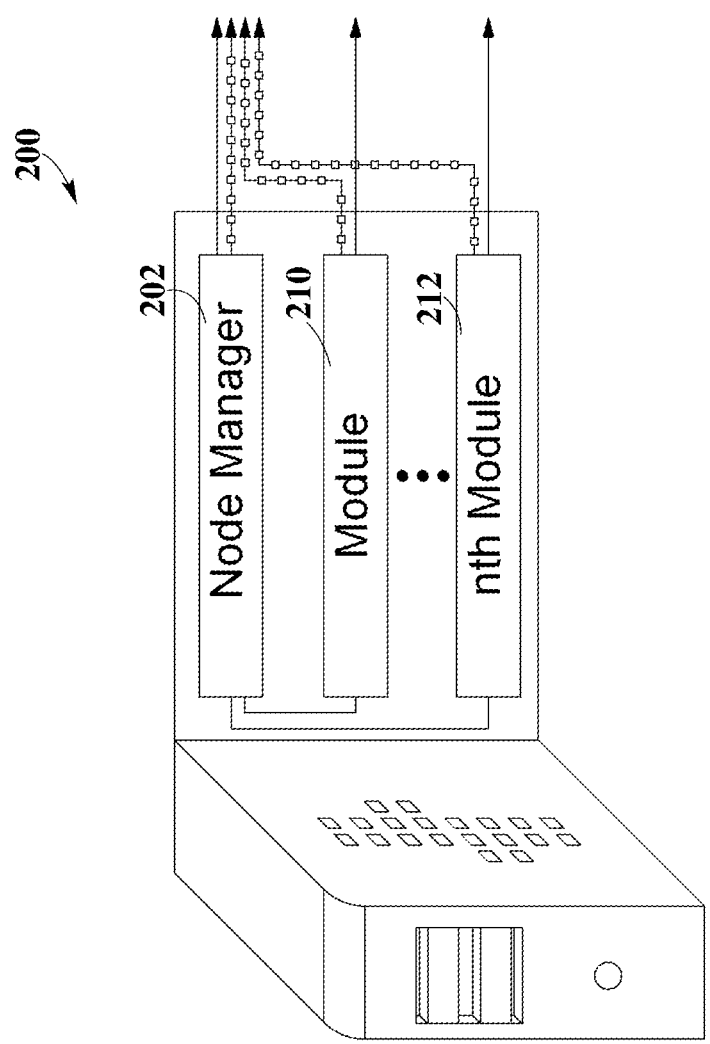
FIG. 2 shows a node configuration according to an exemplary embodiment.

FIG. 2 is a diagram showing a configuration of a node 200, according to an exemplary embodiment. The node 200 in FIG. 2 may comprise a processor executing a node manager 202 software module and any number of additional software modules 210, 212, which may include a first software module 210 and up to nth module 212.

According to the exemplary configuration of FIG. 2, the node 200 may be communicatively coupled over a data network to a second node executing a supervisor module, or supervisor node. A node manager 202 be installed and executed by the node 200 may also configured to communicate with the supervisor node, and may also be configured to monitor a software modules 210, 212 installed on the node, including a first module 210, up to nth module 212. Node manager 202 may execute any suitable commands received from the supervisor, and may additionally report on the status of one or more of the node 200, node manager 202, and from the first module 210 to the nth module 212. The first module 210 may be linked to the one or more supervisors and may be linked to one or more other modules in the node, where other modules in the node may be of a type differing from that of first module 210 or may share a type with first module 210. Additionally, first module 210 may be linked with one or more other modules, nodes, or clusters in the system.

System Operation

System Set-Up

Figure 3:
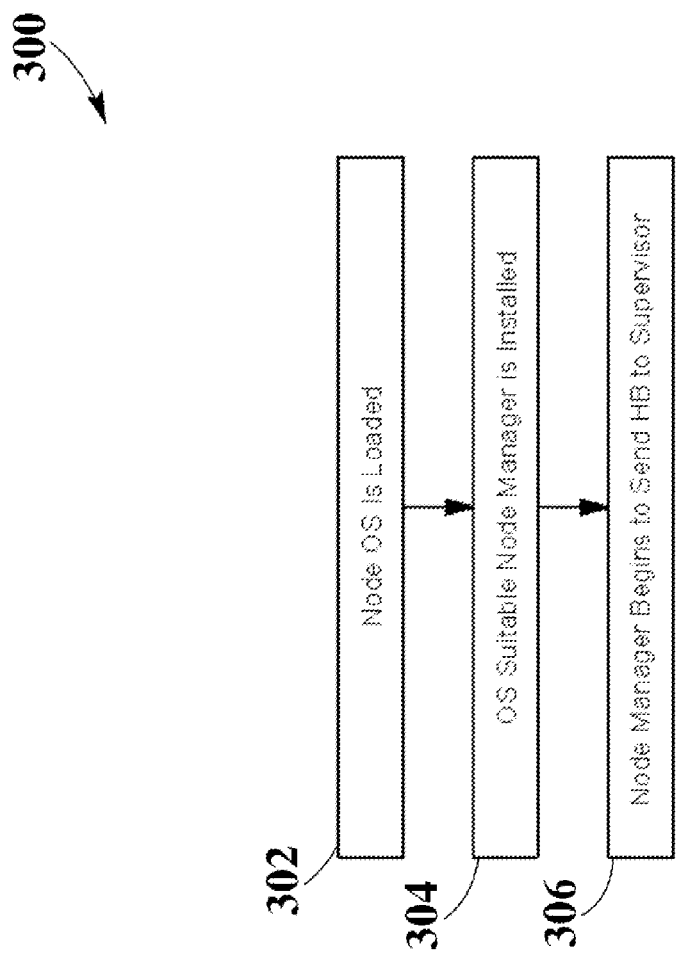
FIG. 3 is a flow chart for setting up a node according to an exemplary embodiment.

FIG. 3 is a flowchart depicting node set-up 300 having steps 302, 304, and 306.

In step 302, an operating system (OS) suitable for use on a node is loaded to the node. In one or more embodiments, the OS may be loaded automatically by the node's manufacturer. In one or more other embodiments, the OS may be loaded on the node by one or more operators.

In step 304, a node manager suitable for use with the OS loaded on the node is installed manually by one or more operators, where the installation may determine which one or more desired modules additional to node manager will be installed on the node.

In step 306, the node manager sends a heartbeat to a supervisor, where said heartbeat may include information sufficient for the supervisor to determine that the node is ready to receive instructions to install one or more modules.

Figure 4:
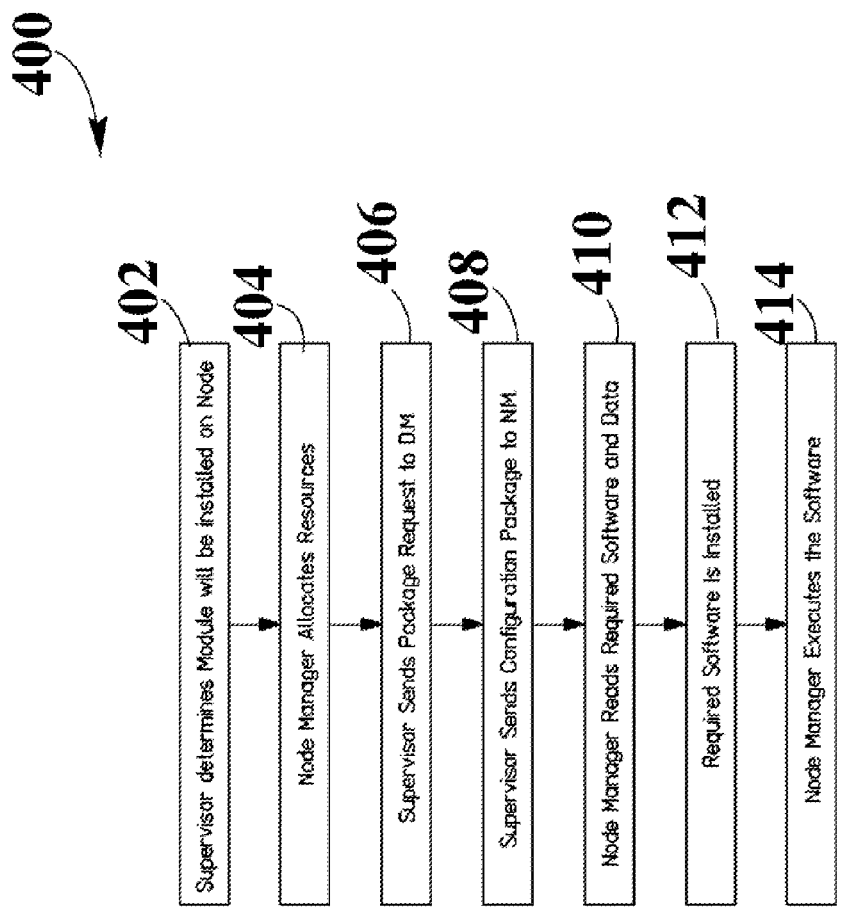
FIG. 4 is a flow chart depicting module set up in a node according to an exemplary embodiment.

FIG. 4 is a flow chart depicting module set-up 400 having steps 402, 404, 406, 408, 410, 412, and 414.

In step 402, the supervisor determines one or more modules are to be installed on one or more nodes, based on the needs of the data collections defined for the system. A supervisor then sends the installation preparation instruction to one or more node managers on said one or more nodes. In some embodiments, the supervisor may track the data collections (including data shards, or portions of data) and the configuration settings associated with the respective collections. The supervisor may also be aware of all available nodes and their resources (as reported by Node Managers). The supervisor may map (i.e., correlate) the system needs to available node resources to determine which data shards or portions, and which system services or resources, should be running on each respective node. The supervisor may then sends deploy/install requests, including any dependencies defined, to the appropriate Node Managers to instruct the node managers to execute the installation on the client-side.

In step 404, the node manager allocates the node's resources, such as computer memory, disk storage and/or a portion of CPU capacity, for running the one or more desired modules. In one or more embodiments, the allocation of resources may expire after a period of time should the supervisor discontinue the process. Non-limiting examples of resources can include computer memory, disk storage and/or a portion of CPU capacity. The resources required may be determined using the data and/or the services that the supervisor is assigning to a given node. Details of required resources may be specified in the package that defines the software and data dependencies, which is stored in the dependency manager.

In step 406, the supervisor sends a request to a dependency manager for one or more configuration packages associated with the one or more modules to be installed on the node.

In step 408, the supervisor may then send the configuration package to the node manager to be deployed, installed and started. The configuration package, which includes all data, software and metadata dependencies, is defined by a system administrator and stored in the dependency manager.

In step 410, the node manager reads any software and data required to run the one or more modules from a suitable server. Suitable software and data may include software, data and metadata suitable for indexing, compressing, decompressing, scoring, slicing, joining, or otherwise processing one or more records, as well as software and data suitable for communicating, coordinating, monitoring, or otherwise interacting with one or more other components in a system.

In step 412, the node manager installs the required software fetched in step 410.

In step 414, the node manager executes the software installed in step 412.

Query Execution

Figure 5:
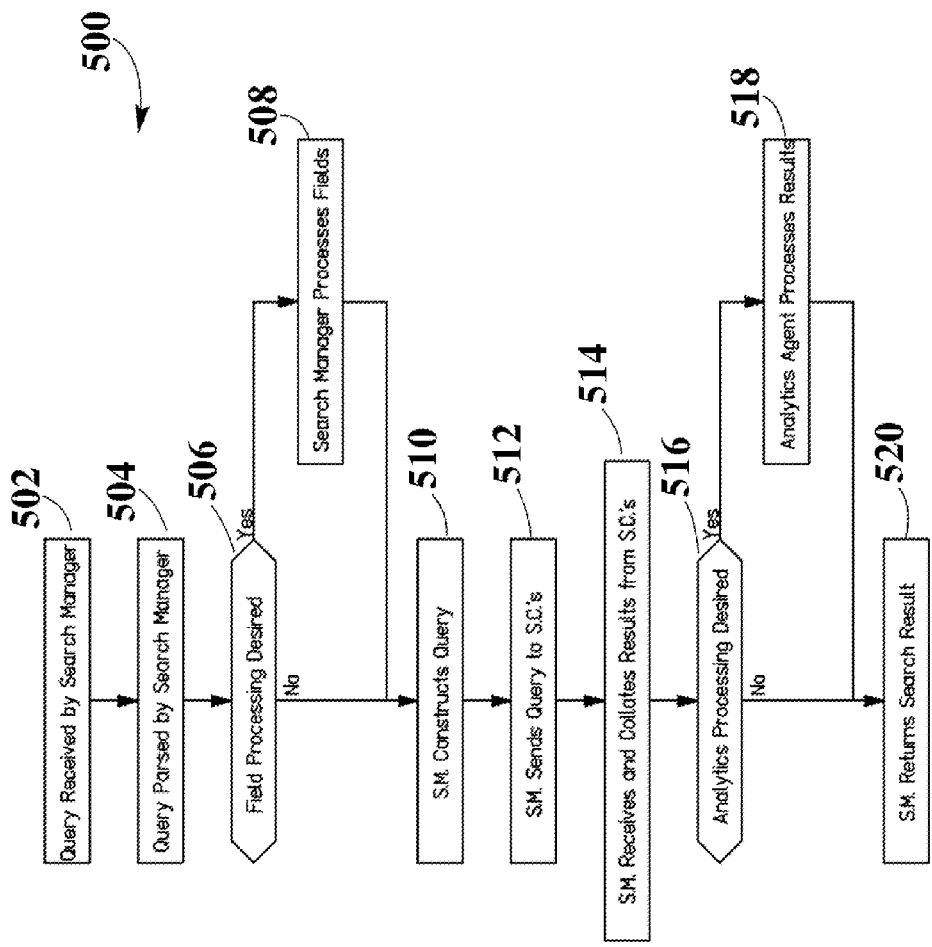
FIG. 5 is a flow chart describing the function of a search manager according to an exemplary embodiment.

FIG. 5 is a flow chart depicting Query Processing 500, having steps 502, 504, 508, 510, 512, 514, 518, and 520, and having checks 506 and 516.

In step 502, database queries generated by an external source, such as a browser-based graphical user interface (GUI) hosted by the system or a native GUI of the client computer, are received by one or more search managers. The queries may comprise binary data representing any suitable software source code, which may contain a user's submitted or a program's automatically-generated search parameters. The source code language used for search queries may be a data serialization language capable of handling complex data structures, such as objects or classes. Data serialization languages may be used for converting complex data objects or structures to a sequence of digital bits, and may provide a data of complex objects in a format that may be managed by most any devices. In some embodiments, the queries may be represented in a markup language, such as XML and HTML, which may be validated or otherwise understood according to a schema file (e.g., XSD). In some embodiments, queries may be represented as, or otherwise communicate, a complex data structure, such as JSON, which may be validated or otherwise understood according to a schema file. Queries may contain instructions suitable to search the database for desired records satisfying parameters of the query; and in some embodiments the suitable instructions may include a list of one or more collections to search.

In step 504, the queries received from the external source may be parsed using according to the associated query language (e.g., SQL) by the one or more search managers, thereby generating a machine-readable query to be executed by the appropriate nodes (e.g., search conductor, analytics agent). In some cases, schema files associated with the software language of the queries may be provided with the query, generated by code generating the query, an accepted standard, or native to the search managers. The schema files may instruct the search managers on parsing the search queries appropriately. For example, if the search queries are prepared using one or more markup languages (e.g., XML) or include a data structure (e.g., JSON), then a schema file, such as an XSD-based schema file, may be associated with the search query code or the data structure to identify and/or validate data within each of the markup tags of the XML code or the JSON code.

In check 506, a search manager may determine, based on the user-provided or application-generated query, whether processing one or more fields of database and/or the queries should be performed. Non-limiting examples of field processing may include: address standardization, determining proximity boundaries, and synonym interpretation, among others. In some embodiments, automated or manual processes of the system may determine and identify whether any other processes associated with the search process 500 will require the use of the information included in the fields of the queries. In some embodiments, the one or more search managers may automatically determine and identify which of the one or more fields of a query may undergo a desired processing.

In step 508, after the system determines that field processing for the one or more fields is desired in check 506, the search managers may apply one or more suitable field processing techniques to the desired fields accordingly.

In step 510, search managers may construct search conductor queries that are associated with the search queries. In some embodiments, the search conductor queries may be constructed so as to be processed by the various nodes of the system (e.g., search managers, search conductors, storage nodes) according to any suitable search query execution plan, such as a stack-based search. It should be appreciated that the search queries may be encoded using any suitable binary format or other machine-readable compact format.

In step 512, the one or more search managers send the one or more search conductor queries to one or more search conductors. In some embodiments, the search managers may automatically determine which search conductors should receive search conductor queries and then transmit the search conductor queries to an identified subset of search conductors. In such embodiments, search conductors may be pre-associated with certain collections of data; and search queries received from the system interface may specify collections to be queried. As such, the search managers transmit search conductor queries to the search conductors associated with the collections specified in the one or more search queries.

In step 514, search conductors return search results to the corresponding search managers. In some embodiments, the search results may be returned synchronously; and in some embodiments, the search results may be returned asynchronously. Synchronously may refer to embodiments in which the search manager may block results or halt operations, while waiting for search conductor results from a particular search conductor. Asynchronously may refer to embodiments in which the search manager can receive results from many search conductors at the same time, i.e., in a parallel manor, without blocking other results or halting other operations. After receiving the search results from search conductors, the search managers may collate the results received from the respective search conductors, based on record scores returned from the search conductors, into one or more results lists.

In check 516, a search manager may determine whether additional analytics processing of the search results compiled by the search managers should be performed, based on an indication in the search query. In some cases, the indication may be included in the search query by the user. In some embodiments, the system determines if the analytics processing is desired using information included in the search query. In some embodiments, the one or more search managers may automatically determine fields should undergo a desired analytics processing. Search queries may be constructed in a software programming language capable of conveying instructions along with other data related to the search query (e.g., strings, objects). Some programming languages, such as markup languages, may use metadata tags embedded into the code to identify various types of data, such as a field indicating a Boolean value whether analytics should be performed or a more complex user-defined field indicating a specific analytics module to be executed and/or the analytics agent node hosting the specific analytics module. Some programming languages, such as javascript or PHP, may reference stored computer files containing code that identifies whether analytics should be performed, which may be a more complex user-defined field indicating the specific analytics module to be executed and/or the analytics agent node hosting the specific analytics module.

In step 518, if the system determines in check 516 that processing is desired, one or more analytics agents apply one or more suitable processing techniques to the one or more results lists. In one or more embodiments, suitable techniques may include rolling up several records into a more complete record, performing one or more analytics on the results, and/or determining information about relationships between records, amongst others. The analytics agent may then return one or more processed results lists to the one or more search managers.

In step 520, the one or more search managers may decompress the one or more results lists and return them to the system that initiated the query.

Figure 6:
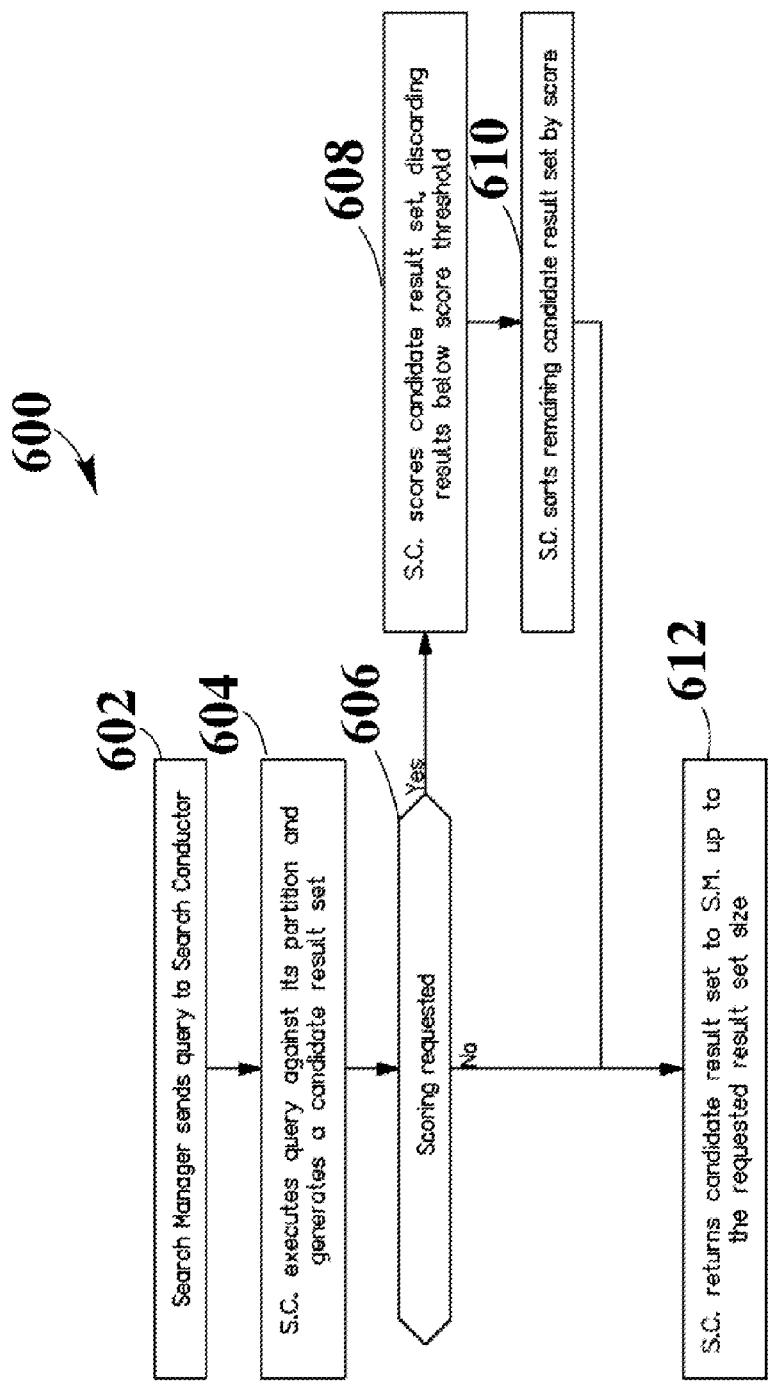
FIG. 6 is a flow chart describing the function of a search conductor according to an exemplary embodiment.

FIG. 6 is a flow diagram depicting search conductor function 600, having steps 602, 604, 608, 610, and 612 as well as check 606.

In step 602, a search manager sends a query to one or more search conductors.

In step 604, a search conductor executes the query against its loaded partition, generating a candidate result set. In one or more embodiments, step 604 may include one or more index searches. In one or more embodiments, the search conductor may use information in one or more schemata to execute the query.

In check 606, the search conductor determines, based on the specified query, whether scoring has been requested in the search conductor query. Scoring may be indicated in the search query received by the search manager.

If scoring is requested, the search conductor scores the candidate result set in step 608. A default score threshold may be defined in the schema, or may be included in the search conductor query sent by the search manager in step 602. In one or more embodiments, an initial scoring may be done by the search conductor at the field level with field specific scoring algorithms, of which there may be defaults which may be overridden by one or more other scoring algorithms. Scoring algorithms may be defined or otherwise identified in the search query and/or the search conductor query, and my be performed by the search conductor accordingly. The search conductor may give the record a composite score based on those individual field scores. In some embodiments, one or more aggregate scoring methods may be applied by the search conductor, which can compute scores by aggregating one or more field scores or other aggregated scores.

In step 610, the search conductor then uses the scores to sort any remaining records in the candidate result set.

In check 612, the search conductor returns the candidate result set to the search manager, where the number of results returned may be limited to a size requested in the query sent by the search manager in step 602.

Collection Partitioning And Partition Loading

In one or more embodiments, data may be added to one or more suitable in-memory databases.

In a first embodiment, data may be loaded in bulk using one or more partitioners.

Figure 7:
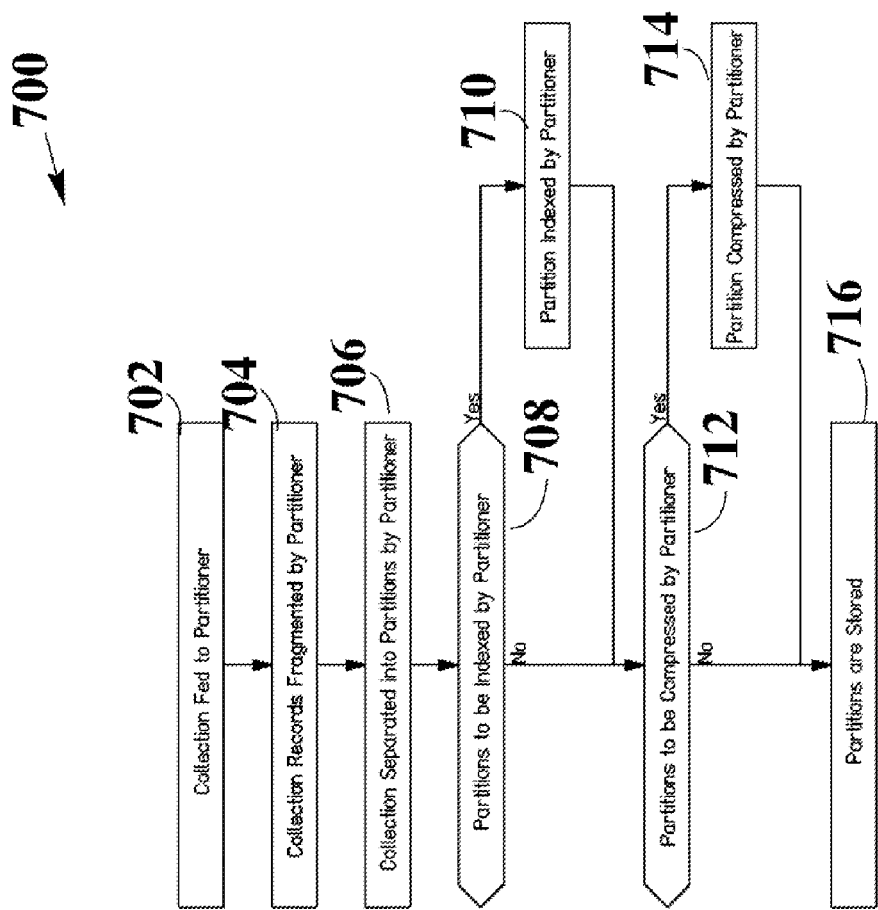
FIG. 7 is a flow chart describing the function of a partitioner according to an exemplary embodiment.

FIG. 7 is a flow diagram depicting collection partitioning 700, having steps 702, 704, 706, 710, and 712, as well as perform check 708.

In step 702, one or more collections are fed into one or more partitioners. The collections are fed in conjunction with one or more schemas so that the one or more partitioners can understand how to manipulate the records in the one or more collections.

In step 704, the records in the one or more collections are fragmented.

In check 708, the system checks the schema for the given data collection and determines whether any fields in the partitions are to be indexed by the partitioner. An index may be any suitable example of a field-index, used in any known database, such as a date index or a fuzzy index (e.g., phonetic).

In step 710, if the system determined in check 708 that the partitioner is to index any fields in the partitions, the partitioner indexes the partitions based on the index definition in the schema.

In check 712, the system checks the schema for the given data collection and determines whether the partitions are to be compressed by the partitioner.

In step 714, if the system determined in check 712 that the partitioner is to compress the partitions, the partitioner compressed the fields and records using the compression methods specified in the schema, which can be any technique suitable for compressing the partitions sufficiently while additionally allowing decompression at the field level.

In step 716, the system stores the partitions suitable for distributing the partitions to one or more search conductors.

Collection partitioning 700 may create an initial load, reload or replacement of a large data collection. The partitioner may assign unique record IDs to each record in a collection and may assign a version number to the partitioned collection, and may additionally associate the required collection schema with that partition set version for use by one or more SMs and one or more SCs.

In a second embodiment, new records may be added to a collection through one or more suitable interfaces, including a suitable query interface. The query interface may support returning result sets via queries, but may also support returning the collection schema associated with a collection version. Additionally, the search interface may allow one or more users to use that collection schema to add new records to the collection by submitting them through the search interface into the search manager. The search manager may then distribute the new record to an appropriate search conductor for addition to the collection. In some embodiments, the search manager may ensure eventual-consistency across multiple copies of a given partition and may guarantee data durability to non-volatile storage to ensure data is available after a system failure.

In one or more embodiments, records may be deleted in a similar manner. The result set from a query may include an opaque, unique ID for each record. This unique ID may encode the necessary information to uniquely identify a specific record in a given version of a collection and may include one or more of the collection name, the partition set version, and the unique record ID, amongst others. With appropriate permissions, the query interface may accept requests to delete a record corresponding to the unique record ID. This record may not be physically deleted immediately, and may be marked for deletion and may no longer be included in future answer sets.

In one or more other embodiments, a new collection schema or a delete request may be submitted to the query interface to create a new collection or remove an existing collection, respectively. A new collection created this way may start out empty, where records can be added using any suitable mechanism, including the mechanism described above.

Figure 8:
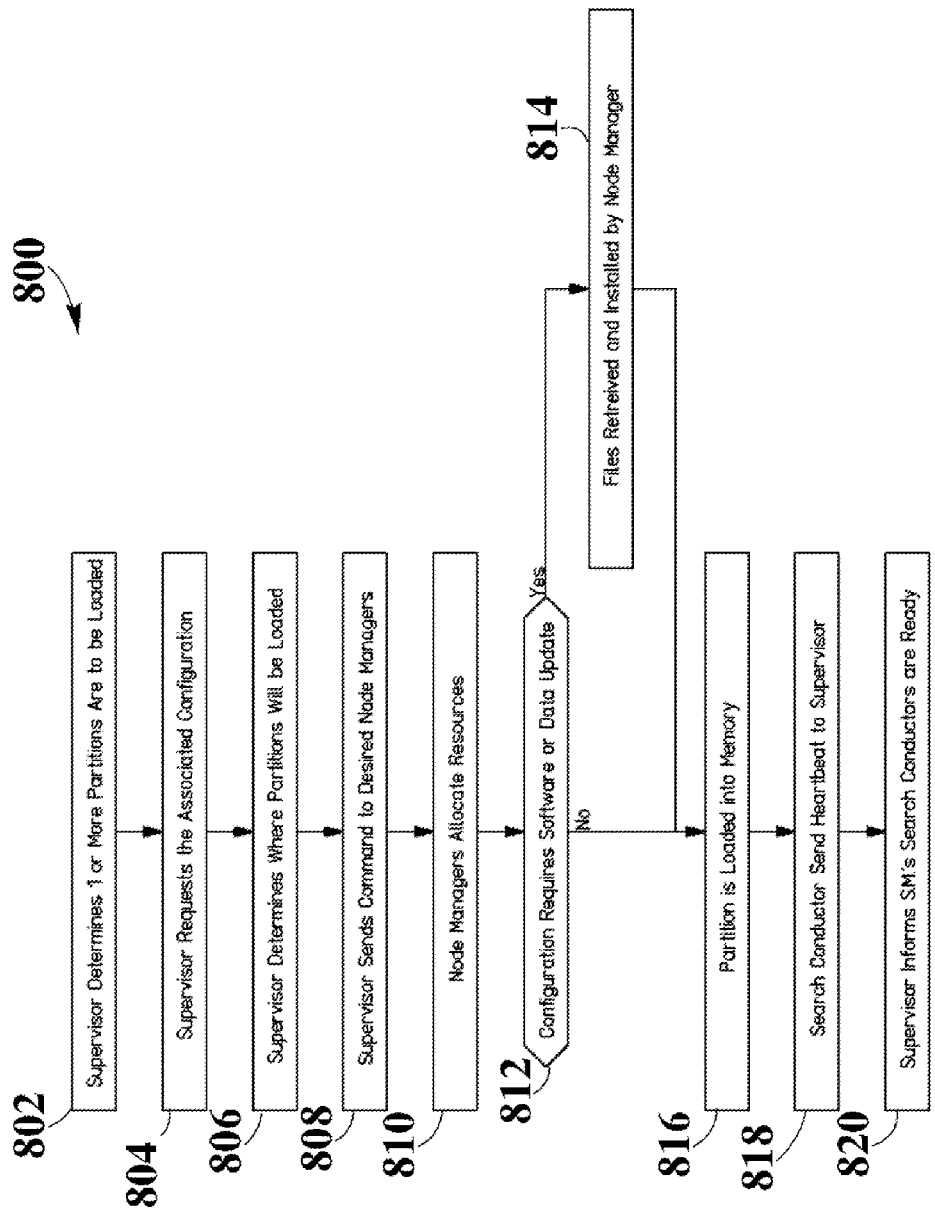
FIG. 8 is a flow chart describing a process of setting up a partition in a search conductor according to an exemplary embodiment.

FIG. 8 is a flow chart depicting partition loading 800, having steps 802, 804, 806, 808, 812, 814, 816, 818 and 820, as well as perform check 810.

In step 802, a supervisor determines one or more partitions are to be loaded into one or more search conductors.

In step 804, the supervisor sends a configuration request to a dependency manager, and the dependency manager returns one or more configuration packages associated with the one or more partitions to be loaded on the one or more search conductors.

In step 806, the supervisor determines which search conductors the partitions are to be loaded on. In one or more embodiments, the supervisor determines which one or more search conductors will be used so as to provide a desired failover ability. In one or more other embodiments, the supervisor determines which one or more search conductors will be used so as to better level out the work load perceived by one or more clusters.

In step 808, the supervisor sends a command to one or more node managers associated with the nodes including the one or more search conductors. In one or more embodiments, the command informs the one or more node managers to await further instructions from the supervisor for loading the partition onto the one or more search conductors. In another embodiment, the command may include the one or more configuration packages associated with the one or more partitions to be loaded into the one or more search conductors. In one or more other embodiments, the command may include instructions to prepare said one or more search conductors for loading a new partition into memory.

In step 810, the one or more node managers allocate any node resources required for loading the partition.

In check 812, the one or more node managers determine if one or more software or data updates are required to load the one or more partitions.

In step 814, if the one or more node managers determined one or more software or data updates are required, the one or more node managers then retrieve said one or more software or data updates from one or more nodes suitable for storing and distributing said one or more software updates. The one or more node managers then proceed to install the one or more retrieved software or data updates.

In step 816, the one or more node managers retrieve the one or more partitions from one or more nodes suitable for storing and distributing one or more partitions. In one or more embodiments, the retrieved partitions have previously been indexed and stored and once retrieved are loaded into memory associated with the one or more search conductors. In another embodiment, the retrieved partitions have not been indexed or compressed previous to being retrieved, and are indexed or compressed by the one or more search conductors prior to being loaded into memory associated with the one or more search conductors.

In step 818, the one or more search conductors send heartbeats to the supervisor and the supervisor determines the one or more search conductors are ready for use in the system.

In step 820, the supervisor informs one or more search managers the one or more search conductors are ready to receive search requests.

Figure 9A:
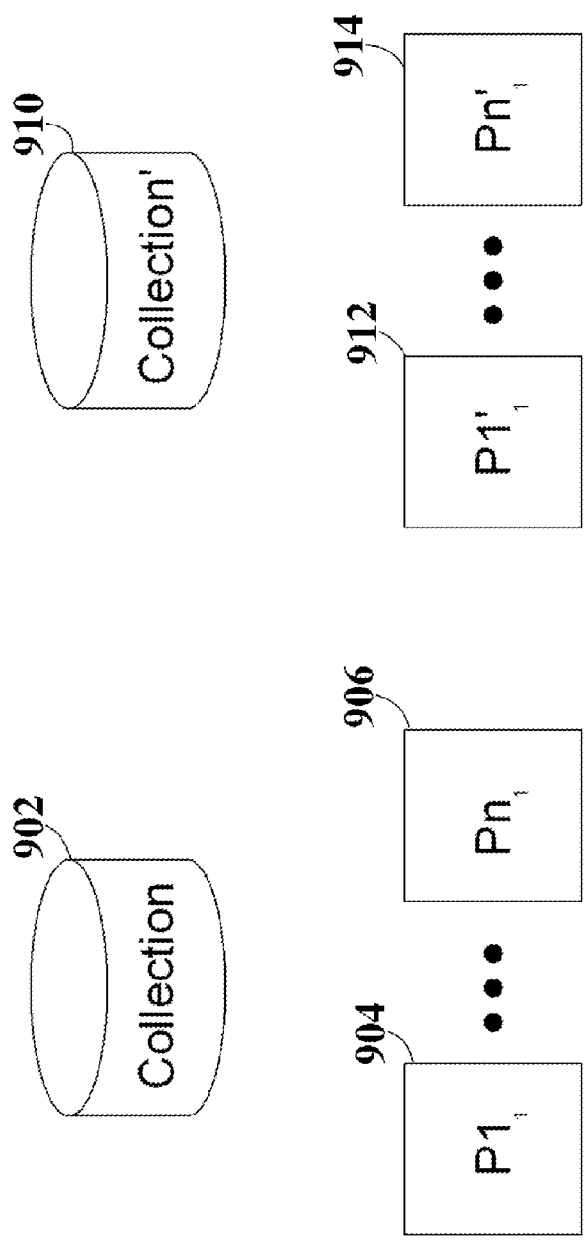
FIG. 9A shows a collection, its updated version, and their associated partitions according to an exemplary embodiment.

FIG. 9A shows collection 902 and an update of collection 902 denoted collection' 910. Collection 902 may be divided into at least a first partition 904 and up to nth partition 906, and collection' 910 may be divided into at least a first partition' 912 and up to nth partition' 914.

Figure 9B:
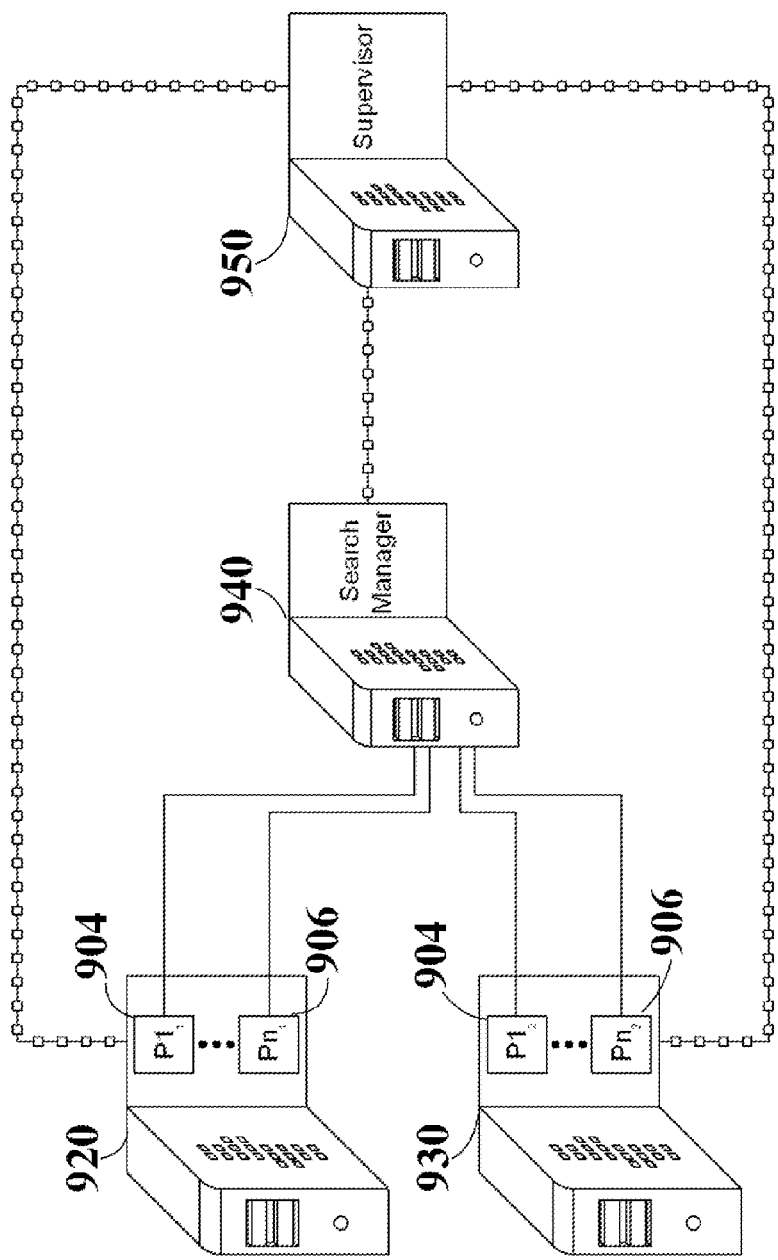
FIG. 9B shows a first and second search node including a first collection connected to a search manager according to an exemplary embodiment.

FIG. 9B shows first search node 920 having a first set of first partition 904 and up to nth partition 906 and second search node 930 having a second set of first partition 904 and up to nth partition 906, where both first search node 920 and second search node 930 may be connected to at least one search manager 940. Additionally, first search node 920, second search node 930 and search manager 940 may be connected to one or more supervisors 950.

Figure 9C:
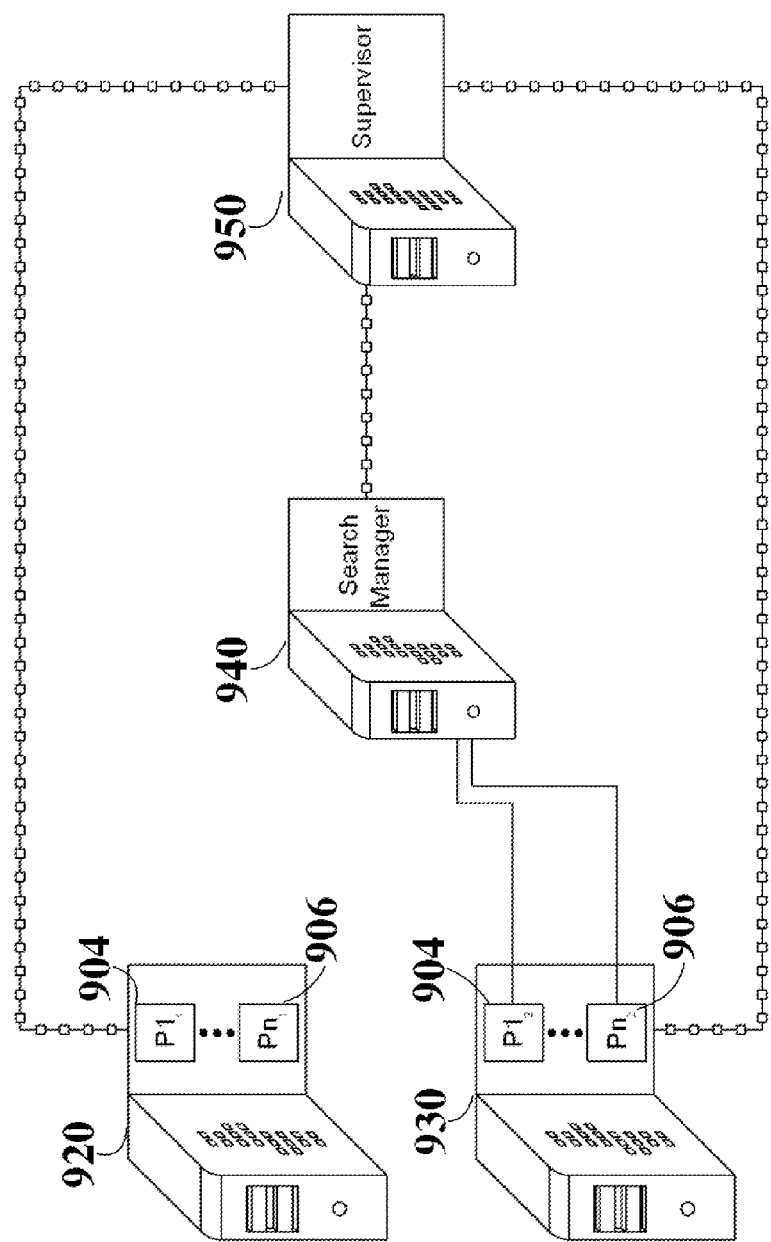
FIG. 9C shows a first search node including a first collection disconnected from a search manager and a second search node including a first collection connected to a search manager according to an exemplary embodiment.

FIG. 9C shows first search node 920 having been disconnected from search manager 940 as a result of a command from supervisor 950, while second search node 930 still maintains a connection. In one or more embodiments, this may allow search manager 940 to run searches for records in collection 902 as first search node 920 is being upgraded.

Figure 9D:
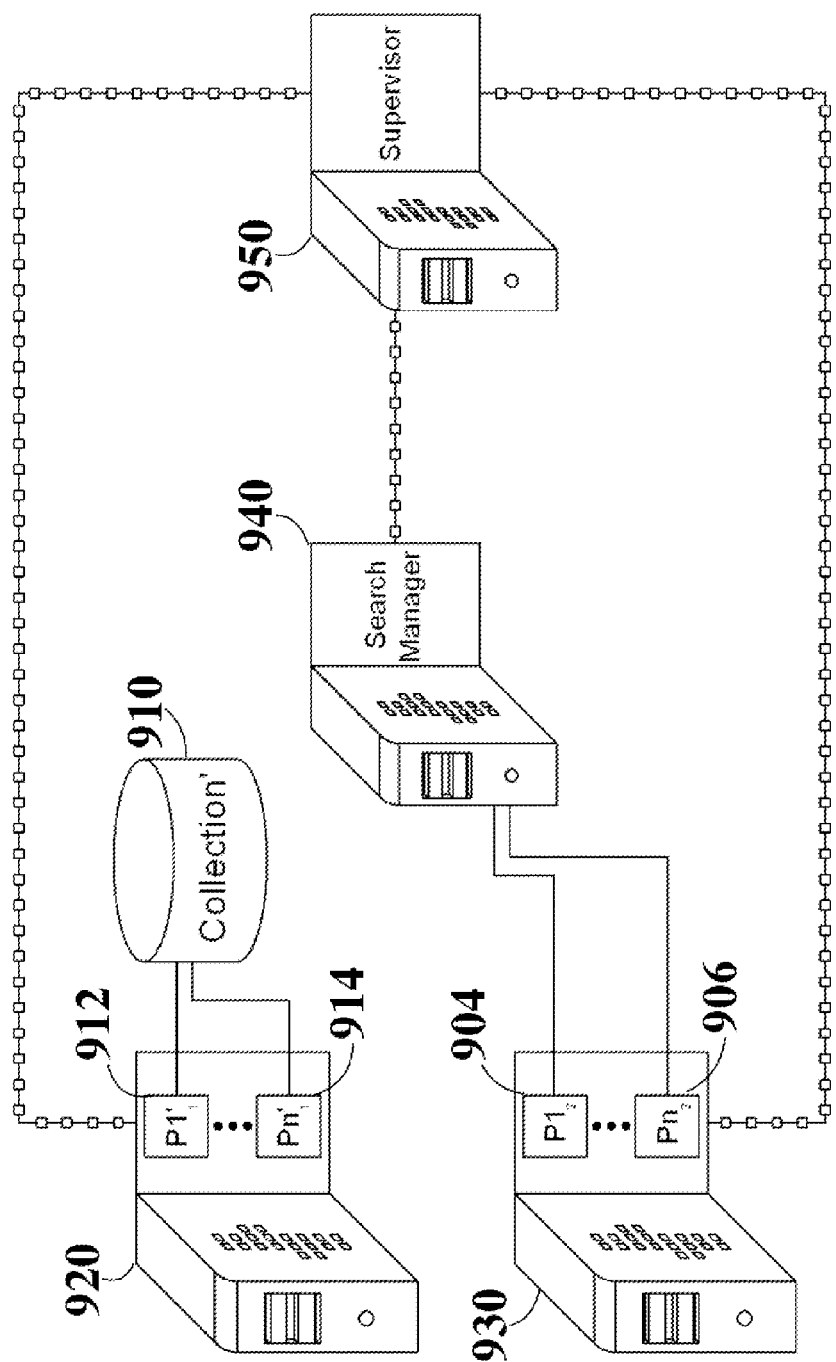
FIG. 9D shows a first search node loading an updated collection, and a second search node connected to a search manager according to an exemplary embodiment.

FIG. 9D shows first search node 920 being updated to include collection' 910.

Figure 9E:
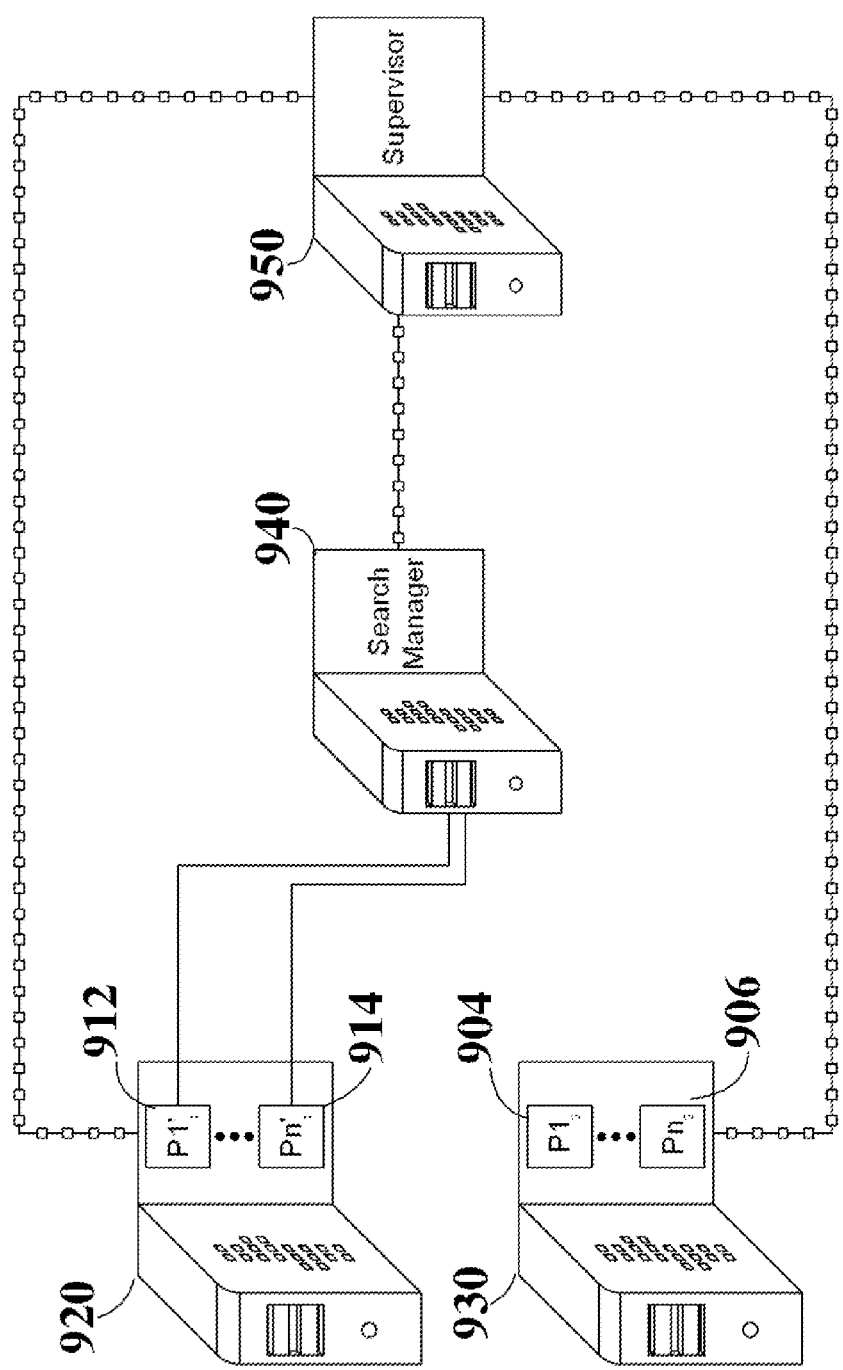
FIG. 9E shows a first search node including an updated collection connected to a search manager, and a second search node including a first collection disconnected from a search manager according to an exemplary embodiment.

FIG. 9E shows first search node 920 having first partition' 912 and up to nth partition' 914 connected to search manager 940 as a result of a command from supervisor 950. supervisor 950 then sends a command to disconnect second search node 930 from search manager 940. In one or more embodiments, this may allow search manager 940 to run searches for records in collection' 910.

Figure 9F:
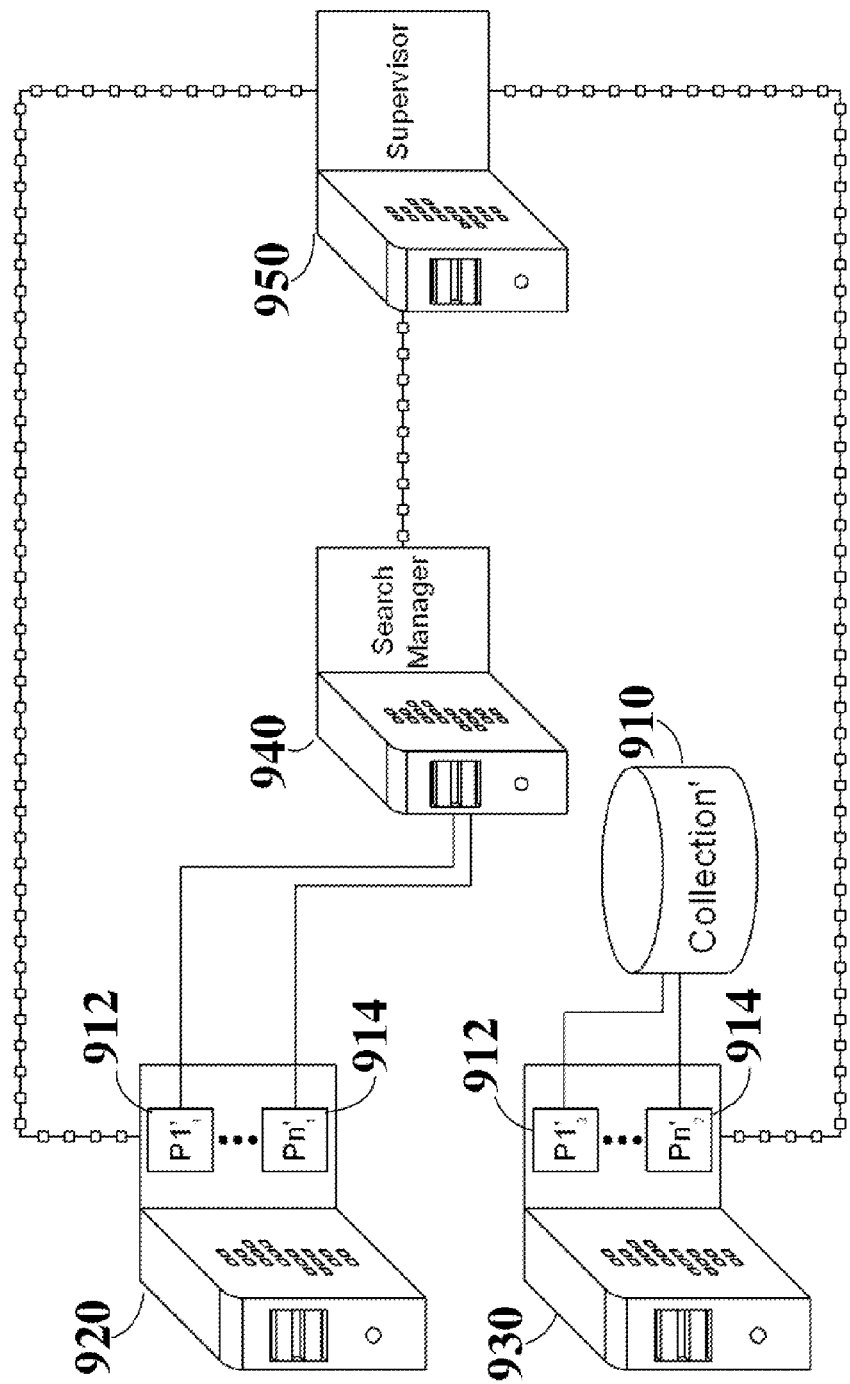
FIG. 9F shows a second search node loading an updated collection, and a first search node connected to a search manager according to an exemplary embodiment.

FIG. 9F shows second search node 930 being updated to include collection' 910.

Figure 9G:
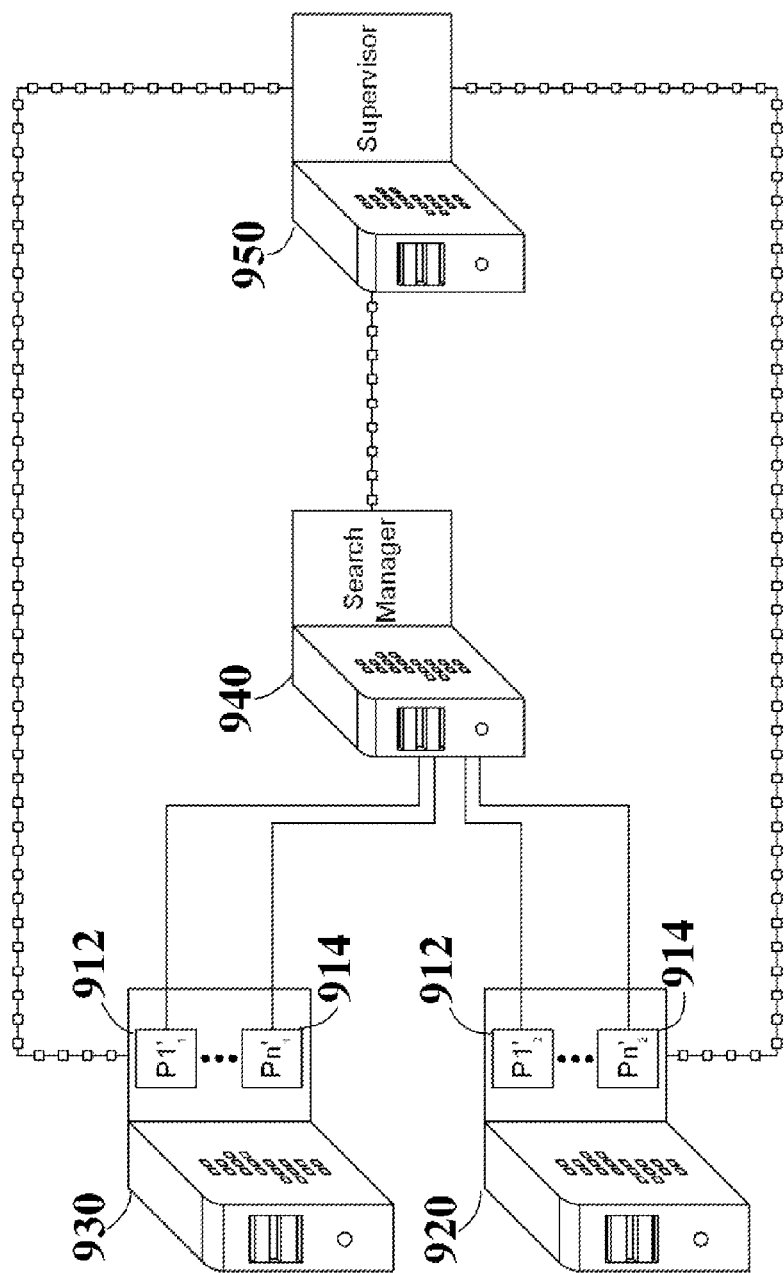
FIG. 9G shows a first and second search node including an updated collection connected to a search manager according to an exemplary embodiment.

FIG. 9G shows first search node 920 having a first set of first partition' 912 and up to nth partition' 914 and second search node 930 having a second set of first partition' 912 and up to nth partition' 914 connected to search manager 940, where the connection between second search node 930 and search manager 940 may have been re-established as a result of a command from supervisor 950. This may allow search manager 940 to run searches for records in collection' 910 in either first search node 920 or second search node 930.

Figure 10:
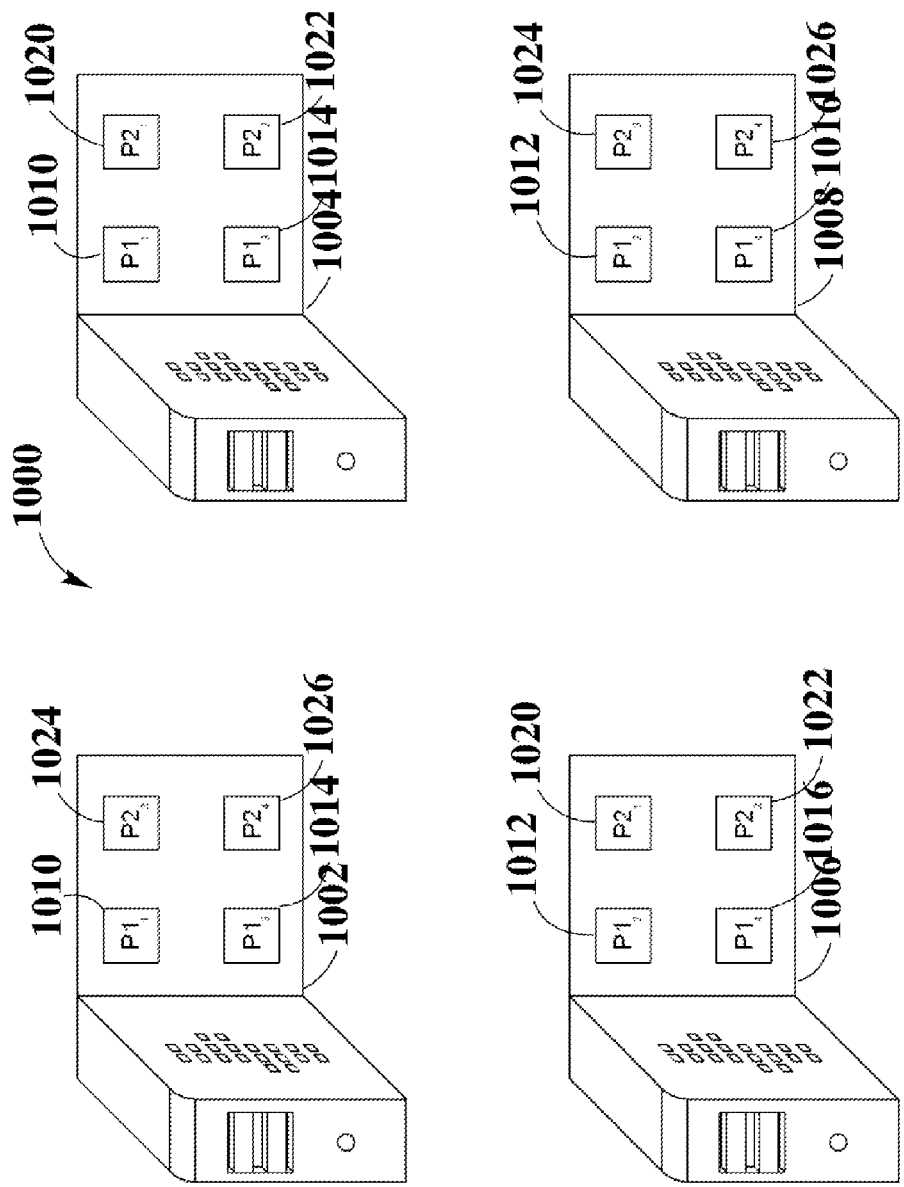
FIG. 10 shows a cluster of search nodes including partitions for two collections according to an exemplary embodiment.

FIG. 10 shows search node cluster 1000, having first search node 1002, second search node 1004, third search node 1006, fourth search node 1008, first partition 1010, second partition 1012, third partition 1014, and fourth partition 1016 for a first collection, and a first partition 1020, second partition 1022, third partition 1024, and fourth partition 1026 for a second collection.

Search node cluster 1000 may be arranged to as to provide a desired level of partition redundancy, where one or more search nodes may be added or removed from the system accordingly. Additionally, the partitions included in the one or more search nodes may vary with time, and may be loaded or unloaded by the search node's node manager following a process similar to partition loading 800. When updating or otherwise changing the partitions in search node cluster 1000, a method similar to that described in FIGS. 9A, 9B, 9C, 9D, 9E, 9F, and 9G may be used.

Example #1 is an in-memory database system including a search manager, an analytics agent, node managers on each node, eight search nodes each having two search conductors, a supervisor, a backup supervisor, a dependency manager, a backup dependency manager, and a partitioner on a node able to store and distribute partitions (where the node includes information for two collections split into four partitions each, collection 1 and collection 2). When a search query for records in collection 1 is received by the database, the search manager sends a query to all the search conductors having the partitioner associated with collection 1. The search conductors work asynchronously to search and score each compressed record, make a list of compressed results having a score above the threshold defined in the query, sort the list of results and return the list of compressed records to the search manager. In this example, the search conductors decompress only the fields that are to be scored. The search manager receives and aggregates the list of results from each search conductor, compiles the query result, and sends it to analytics agent for further processing. The analytics agent combines records it determines are sufficiently related, and returns the processed list of results to the search manager. The search manager then returns the final results through the system interface.

Example #2 is an in-memory database that can perform semantic queries and return linked data results on data that is not explicitly linked in the database. Data or record linking is just one example of an aggregate analytical function that may be implemented in an Analytics Agent. This example is an in-memory database with an analytics agent capable of discovering data linkages in unlinked data and performing semantic queries and returning semantic results. Unlinked data is data from disparate data sources that has no explicit key or other explicit link to data from other data sources. In this example, a pluggable analytics module could be developed and deployed in an Analytics Agent to discover/find data linkages across disparate data sources, based on the data content itself. When a semantic search query is executed, all relevant records are retrieved via search conductors, using non-exclusionary searches, and sent to an analytics agent where record linkages are discovered, based on the specific implementation of the analytics agent module, and confidence scores assigned. These dynamically linked records can be represented using semantic markup such as RDF/XML or other semantic data representation and returned to the user. This approach to semantic search allows unlinked data to be linked in different ways for different queries using the same unlinked data.

Example #3 is an in-memory database that can perform graph queries and return linked data results on data that is not explicitly linked or represented in graph form in the database. This example is an in-memory database with an analytics agent capable of discovering data linkages in unlinked data and performing graph queries and returning graph query results. When a graph search query is executed, all relevant records are retrieved via search conductors, using non-exclusionary searches, and sent to an analytics agent where record linkages are discovered and confidence scores assigned. These dynamically linked records can be represented in graph form such as an RDF Graph, Property Graph or other graph data representation and returned to the user. This approach to graph search allows unlinked data to be linked in different ways for different queries using the same unlinked data.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A computing system hosting an in-memory database, the system comprising:
   a partitioner node comprising a processor configured to, in response to receiving a collection of one or more records of the in-memory database, determine whether to compress the collection based on a machine-readable schema file associated with the collection, logically partition the collection into one or more partitions according to the schema file, and distribute the one or more partitions to one or more storage nodes according to the schema file;
   a storage node comprising a non-transitory machine-readable main memory storing a partition of the in-memory database received from one or more partitioner nodes associated with the storage node according to the schema file;
   a search manager node comprising a processor configured to receive a search query from a client device of the system, and transmit the search queries as search conductor queries to one or more search conductors upon receiving the search query from the client device, wherein the search query is a machine-readable computer file containing parameters associated with one or more records satisfying the search query, and wherein the search manager node transmits the search queries to the one or more search conductors in accordance with the schema file;
   a search conductor node associated with one or more partitioners according to the schema file and comprising a processor configured to, in response to receiving a search conductor query from the search manager node: query a set of one or more partitions of the in-memory database as indicated by the search conductor query, identify one or more candidate records of the in-memory database stored in the set of partitions queried by the search conductor, calculate a first score for each respective candidate record using a scoring algorithm, and transmit to the search manager node a set of one or more query results containing one or more candidate records satisfying a threshold value; and
   an analytics agent node comprising a processor configured to automatically generate a machine-readable computer file containing a set of one or more results derived from the set of query results, responsive to identifying in the set of query results received from the search manager node,
   wherein each of the storage node, the search conductor node, and the analytics agent node is a distinct node.

2. The system according to claim 1, wherein the processor of the analytics agent node is further configured to transmit a set of one or more data linkages to the search manager, wherein the search manager is a distinct node.

3. The system according to claim 1, wherein the processor of the search manager node is further configured to execute one or more field processing algorithms in accordance with the search query.

4. The system according to claim 1, further comprising a supervisor node comprising a processor receiving one or more heartbeat signals from one or more nodes of the system and determining a status for each of the one or more nodes based on a heartbeat signal received from each respective node, wherein each of the respective heartbeat signals indicates the status of the respective node.

5. The system according to claim 4, wherein each respective node comprises a processor configured to monitor the status of the node.

6. The system according to claim 4, further comprising a dependency manager node associated with the supervisor node and comprising a processor monitoring a node configuration status of a node monitored by the supervisor using a machine-readable dependency tree file stored in a non-transitory machine-readable storage medium.

7. The system according to claim 6, wherein the status of the heartbeat signal indicates the node configuration status, and wherein the supervisor node transmits a machine-readable configuration package file responsive to the dependency manager determining the node configuration status indicates the node is misconfigured.

8. The system according to claim 1, wherein the search conductor calculates a field score for each respective candidate record of a set of one or more updated result records, wherein the first score of each respective candidate in the set of updated result records satisfies the threshold value indicated by the search query, and transmits the updated result records to the search manager node.

9. The method according to claim 8, wherein the search conductor decompresses data stored in a candidate record in the set of updated result records using a data compression algorithm, in response to determining the data of the candidate result record is compressed according to the data compression algorithm.

10. The system according to claim 1, further comprising a node comprising a processor executing a query interface module receiving a new collection schema file associated with one or more collections, wherein at least search conductor node is configured to automatically reconfigure one or more collections associated with the search conductor according to the new schema file.

11. The system according to claim 1, wherein the partitioner assigns a unique record identifier to each of the respective records stored in the collection according to the schema file, and generates a machine-readable index file associated with each of the partitions of the collection using the unique record identifier assigned to each respective record in the collection.

12. The system according to claim 11, wherein the search manager node distributes to the search conductor node a set of one or more new records; and wherein the search conductor automatically adds each of the new records to a partition of a collection according to the schema file, responsive to receiving the set of one or more new records.

13. The system according to claim 11, wherein the one or more search managers are further configured to receive and distribute a request to delete one or more records that correspond to a set of unique record identifiers and distribute the request to at least one search conductor; and wherein the search conductor is further configured to mark for deletion each record associated with the set of unique record identifiers.

14. The system according to claim 11, wherein the unique record identifier associated with each of the records comprises one or more of a unique identifier number, a collection version number, a collection name, and a partition version number.

15. The system according to claim 11, wherein the search manager node receives a set of one or more new collections comprising one or more new records, and transmits a set of new collections to the one or more search conductor node according to the schema file, and wherein each respective search conductor node, responsive to receiving the one or more new collections, automatically populates one or more collections associated with the respective search conductor node with the set of new one or more records in accordance with the schema file.

16. The system according to claim 1, wherein a search manager receives a request to remove a collection, the search manager processor is configured to forward the collection deletion request to a search conductor, and the search conductor is further configured to remove the collection from the database.

17. The system according to claim 1, wherein the search manager asynchronously receives each of the search result records from each of the search conductors.

18. The system according to claim 1, wherein the schema describes a collection according to one or more of names of the fields, whether the fields are indexed, a compression used, and a default scoring algorithm for the fields.

19. The system according to claim 1, wherein the analytics agent is further configured to concatenate several records into a more complete record and determine information about neighboring records to the search result records.

20. The system according to claim 1, wherein the search conductor limits the size of the search result records based on the search query received from the search manager.

21. The system according to claim 1, wherein a supervisor instructs a partitioner to compress one or more records in a collection.

22. The system according to claim 1, wherein a supervisor is further configured to determine one or more new partitions to be loaded, requests a node configuration for a node from a dependency manager, wherein the supervisor instructs a node manager of the node to retrieve the node configuration from the dependency manager;
wherein the node manager is configured to allocate memory resources of the node and loads a new partition; and
wherein the search conductor associated with the new partition in accordance with the schema informs the supervisor that the partition is loaded.

23. The system according to claim 1, wherein the analytics agent node identifies in the set of query results received from the search manager node a data linkage correlating two or more records, and wherein the data linkage correlates data contained in a first record associated with data contained in a second record.

24. A computer implemented method comprising:
receiving, by a search manager computer of a system hosting an in-memory database, binary data representing a search query containing parameters for querying the in-memory database, wherein the system comprises one or more storage nodes comprising a main memory storing one or more collections of the in-memory database, and wherein each collection contains one or more records of the in-memory database;
transmitting, by the computer, the search query to one or more search conductor nodes according to the search query, wherein the search query indicates a set of one or more collections of the in-memory database to be queried;
transmitting, by the computer, to one or more analytics agent nodes a set of search results based on the search query upon receiving from the one or more search conductors the set of search results containing one or more records of the in-memory database satisfying the search query, wherein each respective record of the set of search results is associated with a score that is based on a scoring algorithm indicated in the search query; and responsive to the computer receiving a computer file containing a set of one or more data linkages from the one or more analytics agent nodes:

updating, by the computer, the one or more records of the set of search results according to the set of one or more data linkages received from the one or more analytics agent nodes, wherein each of the one or more storage nodes, the one or more search conductors, and the one or more analytics agent nodes is a distinct node.

25. The method according to claim 24, wherein the computer asynchronously receives a subset of search results from each respective search conductor.

26. The method according to claim 25, wherein each subset of search records received from each respective search conductor node is ranked according to the score calculated for the respective record.

27. The method according to claim 24, wherein each respective search conductor associated with the set of collections to be queried determines a set of one or more search results containing the one or more records of the search results according to the parameters of the search query.

28. A computer-implemented method comprising:

receiving, by a computer executing a partitioner module of an in-memory database system comprising one or more computing devices hosting an in-memory database, one or more collections of one or more records of the in-memory database from a search conductor of the in-memory database system according to a machine-readable schema file, wherein each of the collections comprises a set of one or more records of the in-memory database, each record having one or more fields;

partitioning, by the computer, each collection according to the schema file;

compressing, by the computer, the records in the partition according to the schema file; and distributing, by the computer, each of the partitions to one or more associated search conductors to include each of the partitions in each collection corresponding to a partitioner associated with the search conductor, wherein each of the computer, the one or more computing devices, the one or more associated search conductors is a distinct device.

29. The method according to claim 28, further comprising fragmenting, by the computer, the records in each set of records according to the schema.

30. The method according to claim 28, further comprising decompressing, by the computer, the records at a level selected from the group consisting of: a field level, a record level, a partition level, a collection level, and a database level.

* * * * *